United States Patent
Bohm

(10) Patent No.: US 7,356,025 B2
(45) Date of Patent: Apr. 8, 2008

(54) SWITCHING APPARATUS FOR SWITCHING DATA BETWEEN BITSTREAMS

(75) Inventor: Christer Bohm, Nacka (SE)

(73) Assignee: Net Insight AB, Stockholm (SE)

( * ) Notice: Subject to any disclaimer, the term of this patent is extended or adjusted under 35 U.S.C. 154(b) by 825 days.

(21) Appl. No.: 10/432,546

(22) PCT Filed: Oct. 26, 2001

(86) PCT No.: PCT/SE01/02352

§ 371 (c)(1),
(2), (4) Date: Oct. 22, 2003

(87) PCT Pub. No.: WO02/43433

PCT Pub. Date: May 30, 2002

(65) Prior Publication Data

US 2004/0151134 A1    Aug. 5, 2004

(30) Foreign Application Priority Data

Nov. 23, 2000    (SE) ................................ 0004303

(51) Int. Cl.
*H04L 12/50* (2006.01)
*H04Q 11/00* (2006.01)

(52) U.S. Cl. .................. 370/388; 370/395.41

(58) Field of Classification Search ................ 370/388, 370/370, 372, 380, 401, 394, 395.1, 396, 370/369, 373, 360

See application file for complete search history.

(56) References Cited

U.S. PATENT DOCUMENTS 4,417,245 A * 11/1983 Melas et al. ................ 340/2.22

(Continued)

FOREIGN PATENT DOCUMENTS

EP    0781021    6/1997

(Continued)

OTHER PUBLICATIONS

D. K. Hunter, "Switching Systems," Encyclopedia of Computer Science and Technology, vol. 42 (Apr. 2000).

(Continued)

*Primary Examiner*—Kwang Bin Yao
*Assistant Examiner*—Kenan Cehic
(74) *Attorney, Agent, or Firm*—Finnegan, Henderson, Farabow, Garrett & Dunner, L.L.P.

(57) ABSTRACT

An apparatus for switching data between a first set of bitstreams and a second set of bitstreams, each of said bitstreams being divided into recurring frames and each of said recurring frames being divided into time slots, is disclosed. The switch comprises a first set of switching elements, at least one intermediate set of switching elements, and a last set of switching elements. Each switching element comprises a number of input ports and a number of output ports. The input ports of the first set of switching elements are arranged to receive the first set of bitstreams and the output ports of the last set of switching elements are arranged to provide said second set of bitstreams. Furthermore the switching elements are arranged so that there are more than one path from a switching element in the first stage to a switching element in the last stage. Each switching element is arranged so that it provides for both time and space switching of data from incoming bitstreams, referring to the input ports of the switching element, to outgoing bitstreams, referring to the output ports of the switching element.

6 Claims, 12 Drawing Sheets

U.S. PATENT DOCUMENTS

| | | | |
|---|---|---|---|
| 5,291,477 A | | 3/1994 | Liew |
| 5,309,430 A | * | 5/1994 | Verhille et al. ............. 370/397 |
| 5,402,452 A | * | 3/1995 | Powell et al. ................ 375/372 |
| 5,450,074 A | | 9/1995 | Yoshifuji |
| 5,604,734 A | * | 2/1997 | Buhrgard .................... 370/388 |
| 5,945,922 A | | 8/1999 | Gao et al. |
| 6,125,112 A | * | 9/2000 | Koning et al. .............. 370/388 |
| 6,128,292 A | * | 10/2000 | Kim et al. .................. 370/356 |
| 6,188,686 B1 | * | 2/2001 | Smith .......................... 370/388 |
| 6,430,180 B1 | * | 8/2002 | Bohm et al. ................ 370/369 |
| 6,868,084 B2 | * | 3/2005 | Konda ..................... 370/395.1 |
| 6,870,831 B2 | * | 3/2005 | Hughes et al. .............. 370/352 |
| 6,870,838 B2 | * | 3/2005 | Dally .......................... 370/369 |
| 7,046,661 B2 | * | 5/2006 | Oki et al. .................... 370/388 |
| 7,184,432 B2 | * | 2/2007 | Adam et al. ................ 370/360 |
| 2003/0021267 A1 | * | 1/2003 | Wu et al. ................... 370/388 |
| 2004/0095927 A1 | * | 5/2004 | Chang et al. ............... 370/388 |
| 2005/0083939 A1 | * | 4/2005 | Yasukawa et al. ....... 370/395.1 |

FOREIGN PATENT DOCUMENTS

| | | |
|---|---|---|
| WO | WO93/06675 | 4/1993 |
| WO | WO98/20700 | 5/1998 |
| WO | WO99/31849 | 6/1999 |
| WO | WO99/49628 | 9/1999 |

OTHER PUBLICATIONS

Kabacinski et al., "Continuous Bandwidth Nonblocking, Multirate Switching in 3-Stage Clos Networks," in Computers and Communications, 2000. Fifth IEEE Symposium, p. 488-493 (Jul. 3-6, 2000).

Yasukawa et al., "High-Speed Multi-Stage ATM Switch Based on Hierarchical Cell Resequencing Architecture and WDM Interconnection," E82-C IEICE Trans. Electron. 219-_ (Feb. 1999).

Liew et al., "Blocking and Nonblocking Multirate Clos Switching Networks,"6 IEEE/ACM Transactions on Netoworking 307-18 (Jun. 1998).

Chan et al., "Clos-Knockout: A Large-Scale Modular Multicast ATM Switch," E81-B IEICE Trans. Commun. 266-_ (Feb. 1998).

Lee, "Nonblocking Copy Networks for Multicast Packet Switching," 6 IEEE Journal on Selected Areas in Communications 1455-67 (Dec. 1988).

* cited by examiner

SWITCHING APPARATUS FOR SWITCHING DATA BETWEEN BITSTREAMS

FIELD OF THE INVENTION

The present invention generally relates to the field of data- and telecommunications, and more specifically to multipath multistage switches.

BACKGROUND OF THE INVENTION

When constructing large scale switches, it is often advantageous to use smaller building blocks in order to increase the scalability of the switch. One known building block with good scalability is multistage switches. A multistage switch is in turn built up by smaller switching elements, which are arranged in stages. Each switching element has a number of input ports and a number of output ports. For some of these multistage switches, output ports of a switching element in one stage are connected to input ports of different switching elements in a next stage. Thus, if there are at least three stages in such a multistage switch, there is more than one path from an input port of a switching element in the first stage to an output port of a switching element in the last stage. This type of multistage switches is referred to as multipath multistage switches herein. By using the features of a multipath multistage switch, it is possible to create a so-called non-blocking multistage switch.

Early prior art non-blocking multistage switches are built up of an equal number of switching elements in each stage and connections between each switching element in one stage and each switching element in a next stage. However, for these non-blocking multistage switches there are some limitations with respect to the channels that are to be switched. For example, if so called multirate is introduced, i.e. different channels that are to be switched have different bandwidths, the non-blocking properties will not be preserved unless changes are made to the structure of the switch and/or the way resources are allocated in the switch. The same goes for the introduction of multicast, where one channel should be switched from one input port to more than one output port.

Prior art multipath multistage switches for switching time division multiplexed bitstreams are built up of time and space switching elements in the first and the last stage and space switching elements in intermediate stages, i.e. stages in-between the first and the last stage. Thus, when establishing a channel between an input port and an output port in such a multipath multistage switch, there are two conditions that need to be satisfied. First, the bandwidth must be available on all connections and in all switching elements on a path between the input port and the output port. Second, since the intermediate switching elements only perform space switching, the bandwidth must be available in corresponding time slots of frames of bit streams on all connections on the path between the input port and the output port. This limits the freedom of establishing channels through the switch and makes the control of the establishment of channels complex, especially in the case of multicast. In prior art multistage switches the freedom is usually increased by introducing time expansion and/or an increase of the number of space switching elements in intermediate stages (see for example Soung C. Liew et al "Blocking and Nonblocking Multirate Clos Switching Networks, IEEE/ACM Transactions on Networking, Vol. 6, No. 3, June 1998). Time expansion means that the data transfer rate is higher within the multipath multistage switch than it is on input ports and output ports of the multipath multistage switch. However, the introduction of time expansion and/or an increase of the number of switching elements in intermediate stages will lead to an increased demand of accuracy in synchronisation or an increased complexity of the multipath multistage switch, respectively. This will make the switch costly. For a multirate switch the blocking might be severe due to the inability to fit in large channels when several links are utilised. In the extreme case it can be shown that the time expansion or the number of intermediate stages required might go to infinity if the channel can be of any size.

This problem of limited freedom of establishing channels through the switch and thus, the complex control of the establishment of channels in prior art multipath multistage switches, is, as mentioned above, especially severe in the case of multicast. This is due to the fact that, in the case of multicast, it is preferable that the copying of the data pertaining to a channel is made in as late a stage as possible in order to save bandwidth in the earlier stages. In prior art multipath multistage switches it is difficult to find one switching element in an intermediate stage that can carry the multicast channel from one input port to a number of output port since the data pertaining to the channel must be copied into corresponding time slots in frames of outgoing bitstreams at the output ports as they were received at the input port.

Furthermore, the introduction of multirate networks gives rise to problems with the allocation of resources to channels in multipath multistage switches. For example, when resources are allocated to channels these resources must be allocated so that fragmentation of the resources is avoided. Fragmentation may give rise to a situation where a new channel is to be established, for which the resources are available in the switch, but since resources are fragmented, the resources are not available on one path through the switch. In some prior art switches fragmentation is avoided by the application of methods for optimising the resource allocation of the channels (see for example Soung C. Liew et al "Blocking and Nonblocking Multirate Clos Switching Networks, IEEE/ACM Transactions on Networking, Vol. 6, No. 3, June 1998). However, even though the resource allocation is optimised when the channels are established, fragmentation may still arise. This is due to the fact that, over time, new channels will be established and old channels will be terminated. In some prior art multipath multistage switches, this is solved by moving channels that are already established so that the resources are available on one path through the switch. The methods for optimising the bandwidth allocation of the channels and the moving of channels that are already established, will require information of the state of each switching element of the multipath multistage switch. The complexity of moving channels grows with the switch since global knowledge is required. Thus, a problem with these prior art multipath multistage switches is that the complexity of the resource allocation will be high. Another problem is that, even though the resource allocation is optimised and already established channels are moved, the situation described above, where a new channel cannot be established even though the resources are available in the switch, may still occur.

Furthermore, in some prior art switches resource fragmentation is alleviated by the introduction of time expansion and/or an increase of the number of switching elements in intermediate stages. However, the introduction of time expansion and/or an increase of the number of switching elements in intermediate stages will lead to an increased demand of accuracy in synchronisation or an increased complexity of the multipath multistage switch, respectively. Furthermore, for multicast of multirate channels, the introduction of time expansion and/or an increase of the number of switching elements in intermediate stages the switch will only decrease the level of blocking, i.e. the switch will not be non-blocking.

SUMMARY OF THE INVENTION

One object of the invention is to eliminate the problem of severe blocking when establishing multirate channels in multipath multistage switches. Thus, according to a first aspect of the invention, a multipath multistage switch which provides greater freedom as to the possibilities of switching channels through the switch, is provided. The multipath multistage switch according to the invention comprises a number of switching elements that are arranged in stages. Each switching element has a number of input ports and a number of output ports. Each switching element is arranged so that it provides for both time and space switching of data from an incoming bitstream, referring to an input port, to outgoing bitstreams, referring to the output ports. Furthermore, the output ports of each switching element in one stage are connected to the input ports of more than one switching element in a next stage. Finally, the multipath multistage switch according to the invention also comprises a control unit for controlling the time and space switching of the switching elements.

Thus, when a channel is to be established between an input port and an output port in a multipath multistage switch according to the invention, it is only required to find a path between the input port and the output port on which path enough bandwidth to carry the channel is available on all connections and in all switching elements on the path. In other words, the allocation of time slots in a bitstream on a connection is independent of the allocation of time slots in bitstreams on other connections. This is due to the fact that the switching elements in all stages of the multipath multistage switch according to the invention can perform time switching in addition to space switching.

In order to save bandwidth in the early stages of a multipath multistage switch and thus to simplify the set-up of channels when multicast of channels is performed, the copying of channels on multiple connections is preferably performed in a switching element of a late stage of the switch. In view of this, the time switching properties of the multipath multistage switch according to the invention are especially advantageous.

In the multipath multistage switch according to the first aspect, the switching elements need not be located in the same equipment or even on the same premise, but may also be distributed. In the case of a distributed multipath multistage switch the switching elements are preferably connected to each other with optical fibres.

Furthermore, a switching element of the multipath multistage switch according to the first aspect may comprise a set of interconnected switching elements. For example, a switching element may in fact itself be a multipath multistage switch.

A second object of the invention is to eliminate the problem of severe blocking when establishing multicast channels in multipath multistage switches, without increasing the complexity of resource allocation. Thus, according to a second aspect of the invention, a method for allocating bandwidth to a multicast channel from one input port to at least two output ports in a multipath multistage switch according the first aspect of the invention, is provided.

According to the method it is determined whether there is enough available bandwidth to carry the channel in the at least two output ports or not. If there is, it is determined whether there is one switching element in the last but one stage of the multipath multistage switch for which there is enough available bandwidth to carry the channel from the input port via the one switching element to the at least two output ports. If this is the case, the multicast channel may be established via this one switching element, if not it is determined whether there are two switching elements in the last but one stage of the multipath multistage switch for which there is enough available bandwidth to carry the channel from the input port via the two switching elements to the at least two output ports. The method is continued until a number of switching elements in the last but one stage of the multipath multistage switch for which there is enough available bandwidth to carry the channel from the input port via the switching elements to the at least two output ports, is found, or until it has been determined that not even the total number of intermediate switching elements in the last but one stage of the multipath multistage switch have enough available bandwidth to carry the channel from the input port via the switching elements to the at least two output ports.

The method makes use of the recognition that performing multicast in as late a stage as possible will save bandwidth in earlier stages of the switch. Furthermore, the method utilises the fact that the switching elements of all stages of the multipath multistage switch can perform time switching in addition to space switching. More specifically, the method reduces the two conditions when establishing a multicast channel in prior art switches, i.e. that the bandwidth must be available and that it must be available in corresponding time slots of frames of bit streams on all connections on a path between the input port and the output ports, to the condition that the bandwidth must be available on all connections on a path between the input port and the output ports. This reduction increases the possibility that the multicast may be performed in a switching element in the last but one stage of the switch, which in turn saves bandwidth in earlier stages. Thus, the throughput of the switch may be kept high without the utilisation of complex methods for allocating bandwidth to channels.

A third object of the invention is to eliminate the problem of fragmentation of resources without an increase of the complexity of the switch structure. Thus, according to a third aspect of the invention, a multipath multistage switch comprising a number of switching elements that are arranged in a first stage, at least one intermediate stage, and a last stage, is provided. Each switching element has a number of input ports and a number of output ports. Each switching element in the first stage and the last stage is arranged so that it provides for time and space switching of data in an incoming bitstream referring to an input port to outgoing bitstreams referring to the output ports. Each switching element in the at least one intermediate stage is arranged so that it provides for at least space switching of data from an incoming bitstream, referring to an input port, to outgoing bitstreams, referring to the output ports. Furthermore, the output ports of each switching element in one stage are connected to the input ports of more than one switching element in a next stage. On a bit level, the bitstreams between output ports of switching elements and input ports of other switching elements are asynchronous, whilst on a frame level they are synchronous. This adds a flexibility on the bit level which is advantageous in the time switching, whilst it at the same time ensures that data that are received in the same frame at the first stage will arrive in coincident frames at the last stage regardless of along which path they have been transported through the switch. Furthermore, the switching elements are arranged so that there is no phase drift between start of frame signals received at switching elements in the same stage, and so that data which are received between a pair of consecutive start of frame signals at input ports of different switching elements in a stage, will be sent between a pair of consecutive start of frame signals to input ports of switching elements in a next stage and will be received between a pair of consecutive start of frame signals at input ports of the switching elements in the next stage. The multipath multistage switch according to the invention also comprises a control unit for controlling the time and space switching of the switching elements in the first stage and the last stage and the space switching in the switching elements of the at least one intermediate stage.

Due to the fact that the output ports of each switching element in one stage are connected to the input ports of more than one switching element in a next stage, there are multiple paths from an input port of a switching element of the first stage to an output port of a switching element in the last stage. This, together with the way the switch is synchronised and the presence of the control unit, will make it possible to switch different portions of a single channel via different paths through the switch. More specifically, data which are received between a pair of consecutive start of frame signals and pertaining to the same channel, may be switched via different paths from an input port of a switching element in the first stage to an output port of a switching element of the last stage. This is due to the fact that data which are received between a pair of consecutive start of frame signals at the input port of the switching element in the first stage, will be received between a pair of consecutive start of frame signals at an input port of the switching element in the last stage regardless via which path they are switched. The control unit then keeps track of the data pertaining to the same channel between a pair of consecutive start of frame signal, and controls the switching element in the last stage so that these data are sent from the output port of the switching element in the last stage between a pair of consecutive start of frame signals.

Note that the switching elements of the multipath multistage switch according to the third aspect need not be located in the same equipment or even on the same premise, but may also be distributed. In the case of a distributed multipath multistage switch the switching elements are connected to each other with optical fibres.

According the third aspect an apparatus for switching data between a first set of bitstreams and a second set of bitstreams, each of said bitstreams being divided into recurring frames and each of said recurring frames being divided into time slots, is provided. The apparatus comprises:

a first set of switching elements, at least one intermediate set of switching elements, and a last set of switching elements, wherein each switching element comprises a number of input ports and a number of output ports, and a control unit for controlling allocation of bandwidth in outgoing bitstreams, referring to the output ports of the switching elements, said control unit being operatively connected to each of the switching elements.

The input ports of said first set of switching elements are arranged to receive said first set of bitstreams and the output ports of each switching element in said first set of switching elements are operatively connected to input ports of more than one switching element in one of said at least one intermediate set of switching elements. The input ports of said last set of switching elements are operatively connected to output ports of more than one switching element in one of said at least one intermediate set of switching elements and the output ports of said last set of switching elements are arranged to send said second set of bitstreams. Said switching elements are arranged so that data which are received between a pair of consecutive start of frame signals at input ports of switching elements in said first set of switching elements, will be received between a pair of consecutive start of frame signals at input ports of switching elements in said last set of switching elements.

In one embodiment of the apparatus according to the third aspect, each one of said first set of switching elements and said last set of switching elements is arranged so that it provides for both time and space switching of data from incoming bitstreams, referring to the input ports of the switching element, to outgoing bitstreams, referring to the output ports of the switching element, and each one of said at least one intermediate set of switching elements is arranged so that it provides for space switching of data from incoming bitstreams, referring to the input ports of the switching element, to outgoing bitstreams, referring to the output ports of the switching element.

In another embodiment of the apparatus according to the third aspect, each switching element is arranged so that it provides for both time and space switching of data from incoming bitstreams, referring to the input ports of the switching element, to outgoing bitstreams, referring to the output ports of the switching element.

In yet another embodiment of the apparatus according to the third aspect, said switching elements each comprise a slot mapping table designating, for each outgoing time slot of frames of outgoing bitstreams, referring to the output ports of the switching element, an incoming time slot of a frame of an incoming bitstream, referring to an input port of the switching element, from which incoming time slot data that should be written into to the outging time slot should be collected, and said control unit is arranged to control the behaviour of the slot mapping table of each switching element.

Furthermore, a switching element of the multipath multistage switch according to the third aspect may comprise a set of interconnected switching elements. For example, a switching element may in fact itself be a multipath multistage switch.

Furthermore, according to a fourth aspect of the invention, a method for switching multirate channels in a multipath multistage switch, that eliminates the problem with fragmentation of resources without an increase of the complexity of the switch structure, is provided. The multistage switch comprises a number of switching elements arranged in a first stage, at least one intermediate stage, and a last stage. Each switching element has a number of input ports and a number of output ports. Furthermore, the output ports of each switching element in one stage are connected to the input ports of more than one switching element in a next stage. The switching elements are arranged so that data, which are received between a pair of consecutive start of frame signals at input ports of switching elements in one stage, are sent between a pair of consecutive start of frame signals to input ports of switching elements in a next stage and received at the input ports of the switching elements in the next stage between a pair of consecutive start of frame signals. Furthermore, consider a case where data pertaining to a single channel are received in different time slots between a pair of consecutive start of frame signals at an input port of a switching element of the first stage, and there is no single path through the switch having enough capacity for carrying the channel through the switch. Then, in accordance to the invention, the channel data of different time slots are switched via different paths, i.e. via different switching elements in the at least one intermediate stage, to an input port of a switching element of the last stage. Finally, said data pertaining to the single channel are mapped into different time slots that are sent between a pair of consecutive start of frame signals from the switching element of the last stage.

The method eliminates the problem with fragmentation of the resources in a multipath multistage switch when switching multirate channels. This is done by switching different portions of a single channel via different paths through the switch, i.e. channel data of different time slots, but pertaining to the same channel, are switched via different paths. Thus, even though there is no single path through the switch that has enough available bandwidth to carry a channel, the channel may still be switched through multipath multistage switch as long as there are a set of paths that together have enough bandwidth to carry the channel. Furthermore, the possibility of switching different portions of a channel via different paths through the switch facilitates simple, optimal resource allocation rules for establishing channels through a multipath multistage switch.

According to the fourth aspect a method for switching data pertaining to a single channel via different paths through a switching apparatus comprising a first set of switching elements, an intermediate set of switching elements, and a last set of switching elements, wherein each switching element comprises a number of input ports and a number of output ports, and wherein the output ports of said first set of switching elements are operatively connected to the input ports of said intermediate set of switching elements, and wherein the output ports of said intermediate set of switching elements are operatively connected to the input ports of said last set of switching elements, is provided. The method comprises the steps of:

receiving, at an input port of a switching element of said first set of switching elements, data pertaining to a single channel in at least two time slots, wherein said data are received between a pair of consecutive start of frame signals;

sending a first portion of said data in at least one time slot from a first output port of said switching element of said first set of switching elements to an input port of a first switching element of said intermediate set of switching elements and sending a second portion of said data in at least one time slot from a second output port of said switching element of said first set of switching elements to an input port of a second switching element of said intermediate set of switching elements, wherein said first portion of said data and said second portion of said data are sent between a pair of consecutive start of frame signals;

receiving said first portion of said data at said input port of said first switching element of said intermediate set of switching elements and receiving said second portion of said data at said input port of said second switching element of said intermediate set of switching elements, wherein said first portion of said data and said second portion of said data are received between a pair of consecutive start of frame signals;

sending said first portion of said data in at least one time slot from an output port of said first switching element of said intermediate set of switching elements to a first input port of a switching element of said last set of switching elements and sending said second portion of said data in at least one time slot from an output port of said second switching element of said intermediate set of switching elements to a second input port of said switching element of said last set of switching elements, wherein said first portion of said data and said second portion of said data are sent between a pair of consecutive start of frame signals;

receiving said first portion of said data at said first input port of said switching element of said last set of switching elements and receiving said second portion of said data at said second input port of said switching element of said last set of switching elements, wherein said first portion of said data and said second portion of said data are received between a pair of consecutive start of frame signals;

sending said first portion of said data in at least one time slot from an output port of said switching element of said last set of switching elements and sending said second portion of said data in at least one time slot from said output port of said switching element of said last set of switching elements, wherein said first portion of said data and said second portion of said data are sent between a pair of consecutive start of frame signals.

Furthermore, according to a fifth aspect of the invention, a method for allocating bandwidth to a channel from an input port of a switching element in a first stage to an output port of a switching element of a last stage of a multipath multistage switch, that eliminates the problem with fragmentation of resources without an increase of the complexity of the switch structure, is provided. According to the method a number of paths from the input port to the output port, which paths together have enough available bandwidth to carry the channel, are found. More specifically, for a multipath multistage switch according to the third aspect of the invention which has a first stage, an intermediate stage and a last stage, the method is performed as follows. First, a first path from the switching element of the first stage via one of the switching elements in the intermediate stage to the switching element in the last stage, is checked for available bandwidth. If the available bandwidth of the first path is not enough to carry the channel, a second path from the switching element of the first stage via another one of the switching elements in the intermediate to the switching element in the last stage, is checked for available bandwidth. This is continued until the joint bandwidth of paths from the switching element of the first stage via different ones of the switching elements in the intermediate to the switching element in the last stage, is large enough to carry the channel.

The method utilises the fact that channel data of different time slots, but pertaining to the same channel, may be switched via different paths in a multipath multistage switch according to the third aspect of the invention.

According to the fifth aspect of the invention a method for allocating, to a single channel, time slots in frames of bitstreams from a switching element in a first set of switching elements to two switching elements in an intermediate set of switching elements and in frames of bitstreams from said two switching elements in said intermediate set of switching elements to a switching element in a last stage, is provided. The method comprises the steps of:

identifying a first switching element in the intermediate stage, for which there is at least one available time slot in each frame of a bitstream from said switching element in the first set of switching elements to said first switching element in said intermediate set of switching elements, and at least one available time slot in each frame of a bitstream from said first switching element in said intermediate set of switching elements to said switching element in said last set of switching elements;

allocating to said channel said at least one available time slot in the bitstream from said switching element in the first set of switching elements to said first switching element in said intermediate set of switching elements, and said at least one available time slot in the bitstream from said first switching element in said intermediate set of switching elements to said switching element in said last set of switching elements;

identifying a second switching element in the intermediate stage, for which there is at least one available time slot in each frame of a bitstream from said switching element in the first set of switching elements to said second switching element in said intermediate set of switching elements, and at least one available time slot in each frame of a bitstream from said second switching element in said intermediate set of switching elements to said switching element in said last set of switching elements; and allocating to said channel said at least one available time slot in the bitstream from said switching element in the first set of switching elements to said second switching element in said intermediate set of switching elements, and said at least one available time slot in the bitstream from said second switching element in said intermediate set of switching elements to said switching element in said last set of switching elements.

BRIEF DESCRIPTION OF THE DRAWINGS

Exemplifying embodiments of the invention will be described below with reference to the accompanying drawings, wherein.

DETAILED DESCRIPTION OF EMBODIMENTS

Figure 1:
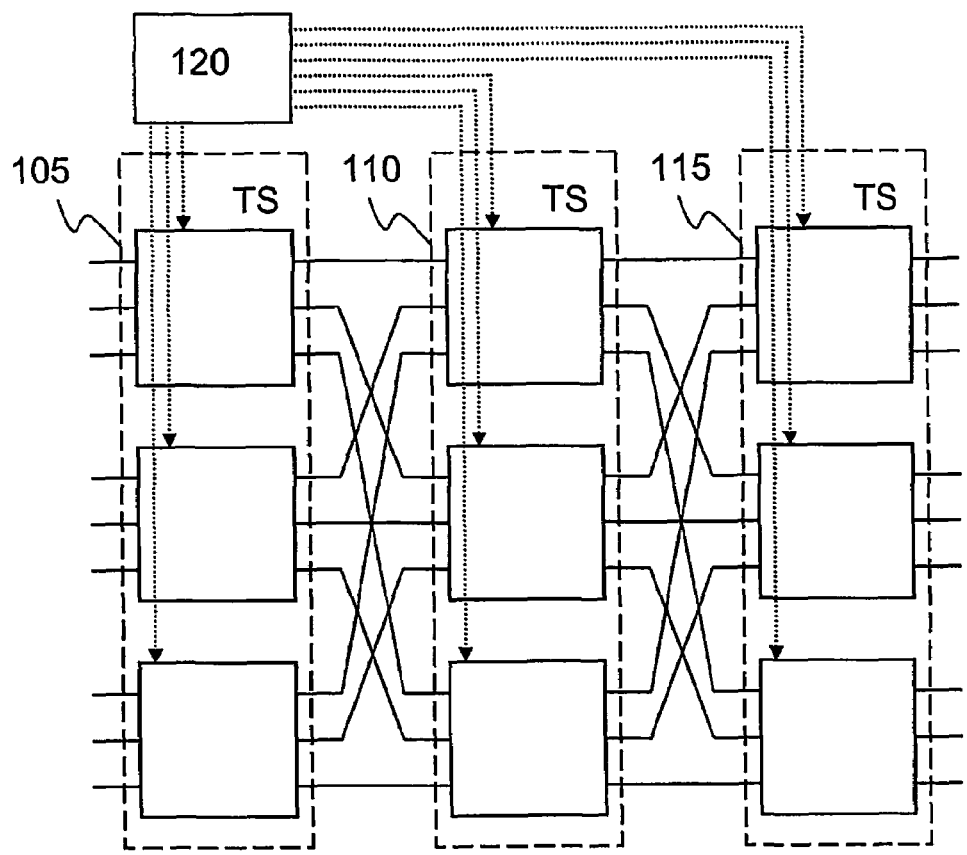
FIG. 1 is a schematic diagram of an embodiment of a multipath multistage switch according to the invention.

In FIG. 1, a schematic diagram of one embodiment of a multipath multistage switch according the invention, is shown. The multipath switch comprises nine switching elements arranged in a first stage 105, an intermediate stage 110 and a last stage 115, each stage having three switching elements. Each switching element has three input ports and three output ports, where the output ports of a switching element in one stage are connected input ports of different switching element in a next stage. In operation, the input ports of the switching elements will be connected to receive data in bitstreams which are divided into essentially fixed sized frames, which in turn are divided into fixed sized time slots. Each of the switching elements is then capable of performing switching in both space and time of data from an incoming bitstream, referring to an input port of the switching element, to outgoing bitstreams, referring to the output ports of the switching element. In other words, data in a time slot of a frame in an incoming bitstream, referring to an input port of a switching element, may be mapped into an arbitrary time slot of a frame in an outgoing bitstream, referring to any one of the output ports of the switching element. Finally, the multipath multistage switch according to the invention also comprises a control unit 120 which is operatively connected to each of the switching elements and controls the time and space switching of the switching elements. Note that the number of switching elements, the number of stages and the number of input and output ports of each switching element in FIG. 1 have been chosen merely as an example. The numbers may be chosen arbitrarily as long as the number of stages are at least three and there are more than one path from an input port of a switching element in the first stage 105 to an output port of a switching element of the last stage 115. Moreover, the number of switching elements in the different stages need not be equal.

By using the multipath multistage switch shown in FIG. 1, the possibility to find a path from a switching element in the first stage 105 to a switching element in the last stage 115, which path can carry a channel is increased in comparison with prior art switches, since the switching elements in the intermediate stage 110 also provide for time switching, i.e. data that are mapped into time slots of a frame in a incoming bitstream to a switching element in the intermediate stage 110 may be mapped into arbitrary time slots of frames in outgoing bitstreams from the switching element. In this case it is sufficient to find a switching element in the intermediate stage 110 that has enough available time slots in frames of an incoming bitstream from the switching element in the first stage 105 to carry the channel and enough available time slots in frames of an outgoing bitstream to the switching element in the last stage 115 to carry the channel.

Figure 2:
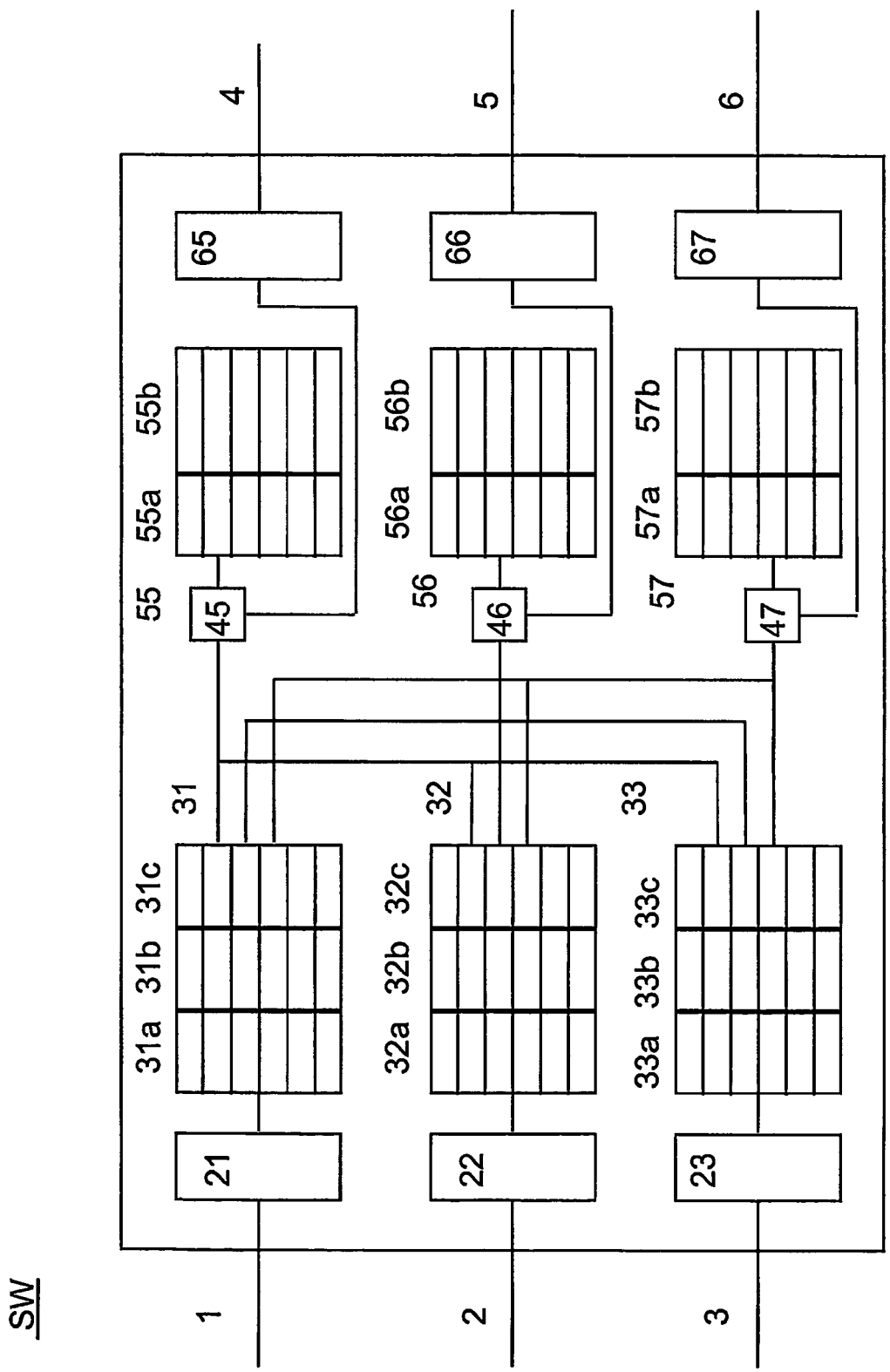
FIG. 2 shows an exemplifying embodiment of a switching element in the multipath multistage according to FIG. 1.

An exemplifying embodiment of a switching element in the multipath multistage according to FIG. 1 will now be described with reference to FIG. 2. In FIG. 2, the switching element SW, which may be the used in the multipath multistage switch shown in FIG. 1, receives time slot data from three input bitstreams 1-3 and transmits the received time slot data to three output bitstreams 4-6. Accordingly, the switch SW comprises three input medium access units 21-23 and three output medium access units 65-67 providing access to the respective bitstreams.

Each input medium access unit 21-23 is arranged to write each frame received from the respective bitstream into a respective frame buffer 31-33. Each frame buffer 31-33 has capacity to store three sequential frames of the respective bitstream in three corresponding memory areas or columns, 31a-31c, 32a-32c, and 33a-33c, also called pages, each memory area having capacity to store one frame. For example, the frame buffer 31, which temporarily stores each frame received from the bitstream 1 via the input medium access unit 21, will sequentially store a first frame in the memory page 31a, the next (second) frame in the memory page 31b, and the following (third) frame in the memory page 31c. Then, the following (fourth) frame will be stored again using the memory page 31a, thus overwriting the previously stored first frame. Also, note that the time slot data from the time slots of a frame are written sequentially into corresponding time slot data fields of the respective memory page, i.e. one data field for each input time slot.

At the same time, three time slot data selection units 45-47, which, may be provided, e. g., in the form of multiplexors or a tn-state buses, are arranged to select time slot data to be transmitted into the respective output bitstreams 4-6 by deciding, for each output time slot to be transmitted into the respective output bitstreams, which frame buffer, and memory page thereof, and from which time slot data entry thereof (i.e. among the presently stored time slot data from all three input bitstreams 1-3) the time slot data slot is to be collected, or passed on, to the respective output bitstream. Hence, each selection unit 45-47 is connected to all three frame buffers 31-33 for the selection and collection of time slot data therefrom.

In order to know which frame buffer, page and entry or field thereof to be used for a specific output time slot, each selection unit 45-47 has access to a respective slot mapping table 55-57, which, for each time slot of the respective output bitstream frame and at a respective entry, provides one field (of a memory area or column 55a-57a) designating the frame buffer and one field (of a memory area or column 55b-57b) designating the entry or field thereof to be used for collecting the given output time slot. The output time slot entries of the slot mapping tables 55-57 is preferably stored in the time sequential order of the corresponding output frame, and each slot mapping table is stepped through once each frame of the respective bitstream.

Hence, when collecting time slot data for the first time slot in each frame of the bitstream 4, the selection unit 45 will access the first entry of the slot mapping table 55, more specifically the first data field of the column 55a and the first data field of the column 55b to derive information as to which one of the three frame buffers and which entry or field thereof that time slot data is to be collected for the first output time slot of the frame of the bitstream 4. Also, the selection unit 45 will control the selection of which memory area or page of each frame buffer 31-33 that is to be used for the collection of time slot data for the frame currently being written into the bitstream 4. Accordingly, the selection unit will pick time slot data in given output order for each time slot of the output bitstream to receive time slot data. Of course, the switch SW will only transmit time slot data into those slots of the output bitstream allocated for that purpose.

For a more detailed description of the switching elements reference is made to the International patent application WO99/25099, the complete disclosure of which is incorporated herein by reference.

In an embodiment of a multipath multistage switch according to FIG. 1 where each switching element is a switching element according to FIG. 2, the control unit would control the time and space switching of each switching element by means of the configuration and reconfiguration of the slot mapping table (SMT) of each switching element.

Figure 3:
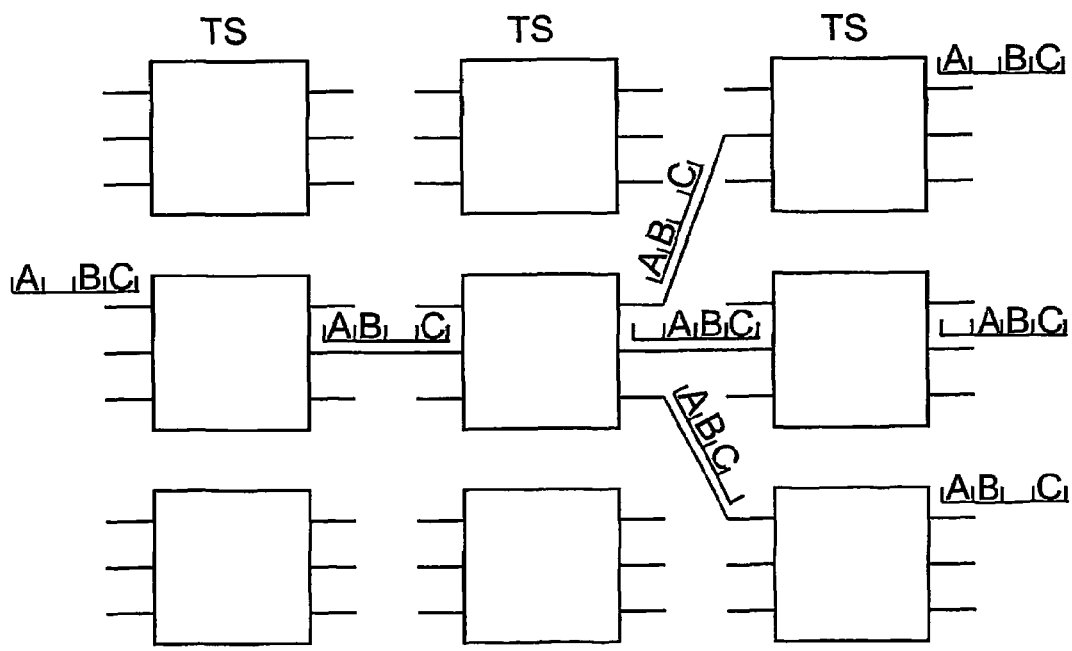
FIG. 3 schematically shows an example of the switching of a multicast channel in the multipath multistage switch shown in FIG. 1.

FIG. 3 schematically shows an example of the switching of a multicast channel from an input port of a switching element in the first stage 105 to output ports of the three switching elements in the last stage 110 in the multipath multistage switch shown in FIG. 1. In the following, the switching elements of each stage of the multipath multistage switch in FIG. 3 are referred to as a first, a second and a third switching element from top to bottom, the input ports of each switching element are referred to as a first, a second and a third input port from top to bottom, and the output ports of each switching element are referred to as a first, a second and a third output port from top to bottom. Data A, B and C pertaining to the multicast channel, are received in a first, a third and a fourth time slot, respectively, of a frame in an incoming bitstream at the first input port of the second switching element in the first stage. In the second switching element in the first stage, the data A, B and C are mapped into a first, a second and a fourth time slot, respectively, of a frame in an outgoing bitstream from the second output port of the second switching element in the first stage, and sent to the second input port of the second switching element in the intermediate stage. In the second switching element of the intermediate stage, the data A, B and C are copied and mapped into time slots of frames in outgoing bitstreams from the first, the second and the third output ports of the second switching element of the intermediate stage. More specifically, the data A, B and C are mapped into a first, a second and a fourth time slot, respectively, of a frame in an outgoing bitstream from the first output port of the second switching element in the intermediate stage, the data A, B and C are mapped into a second, a third and a fourth time slot, respectively, of a frame in an outgoing bitstream from the second output port of the second switching element in the intermediate stage, and the data A, B and C are mapped into a first, a second and a third time slot, respectively, of a frame in an outgoing bitstream from the third output port of the switching element in the intermediate stage. The frame in the outgoing bitstream from the first output port, the frame in the outgoing bitstream from the second output port, and the frame in the outgoing bitstream from the third output port of the second switching element in the intermediate stage, are then sent to the second input port of the first switching element, the second input port of the second switching element, and the second input port of the third switching element in the last stage, respectively. Finally, in the first switching element of the last stage, the data A, B and C are mapped into a first, a third and a fourth time slot, respectively, of a frame in an outgoing bitstream at the first output port of the switching element. In the second switching element of the last stage, the data A, B and C are mapped into a second, a third and a fourth time slot, respectively, of a frame in an outgoing bitstream at the second output port of the switching element. In the third switching element of the last stage, the data A, B and C are mapped into a first, a second and a fourth time slot, respectively, of a frame in an outgoing bitstream at the first output port of the switching element.

Note that in the switching element in the intermediate stage, the data A, B and C are copied and mapped into different time slots of the frames in the outgoing bitstreams from the first output port, the second output port and the third output port. This is possible since the switching elements in the intermediate stage can perform time switching in addition to space switching. Thus, the time slots in which data pertaining to the channel are mapped in the outgoing bitstream at one of the output ports of the switching element in the intermediate stage are independent from the time slots in which data pertaining to the channel are mapped in the outgoing bitstreams at the other output ports of the switching element. Moreover, the time slots in which data pertaining to the channel are mapped in the outgoing bitstreams at the output ports of the switching element in the intermediate stage are independent from the time slots in which data pertaining to the channel are mapped in the incoming bitstreams at the input port of the switching element.

Furthermore, the number of time slots in each frame is not essential to the invention. Thus, the fact that the number of time slots in each frame is four in FIG. 2 is just an example.

The features of the multipath multistage switch in FIG. 1 are especially advantageous in the case of multicast of channels, i.e. data pertaining to a channel should be switched from an input port of a switching element in the first stage of a multipath multistage switch to output ports of at least two switching elements in the last stage. For example, consider a case where data pertaining to a channel are sent to one switching element in the intermediate stage where they are received in time slots of a frame in an incoming bitstream at an input port. The data are then to be copied into time slots of frames in outgoing bitstreams at more than one output port of the switching element of the intermediate stage and sent to the at least two switching elements in the last stage. In this case, in the multipath multistage switch according to the invention, it is sufficient to find a switching element in the intermediate stage that has enough available time slots in frames of an incoming bitstream from the switching element in the first stage to carry the channel, and enough available time slots in frames of an outgoing bitstreams to the at least two switching elements in the last stage to carry the channel.

Figure 4:
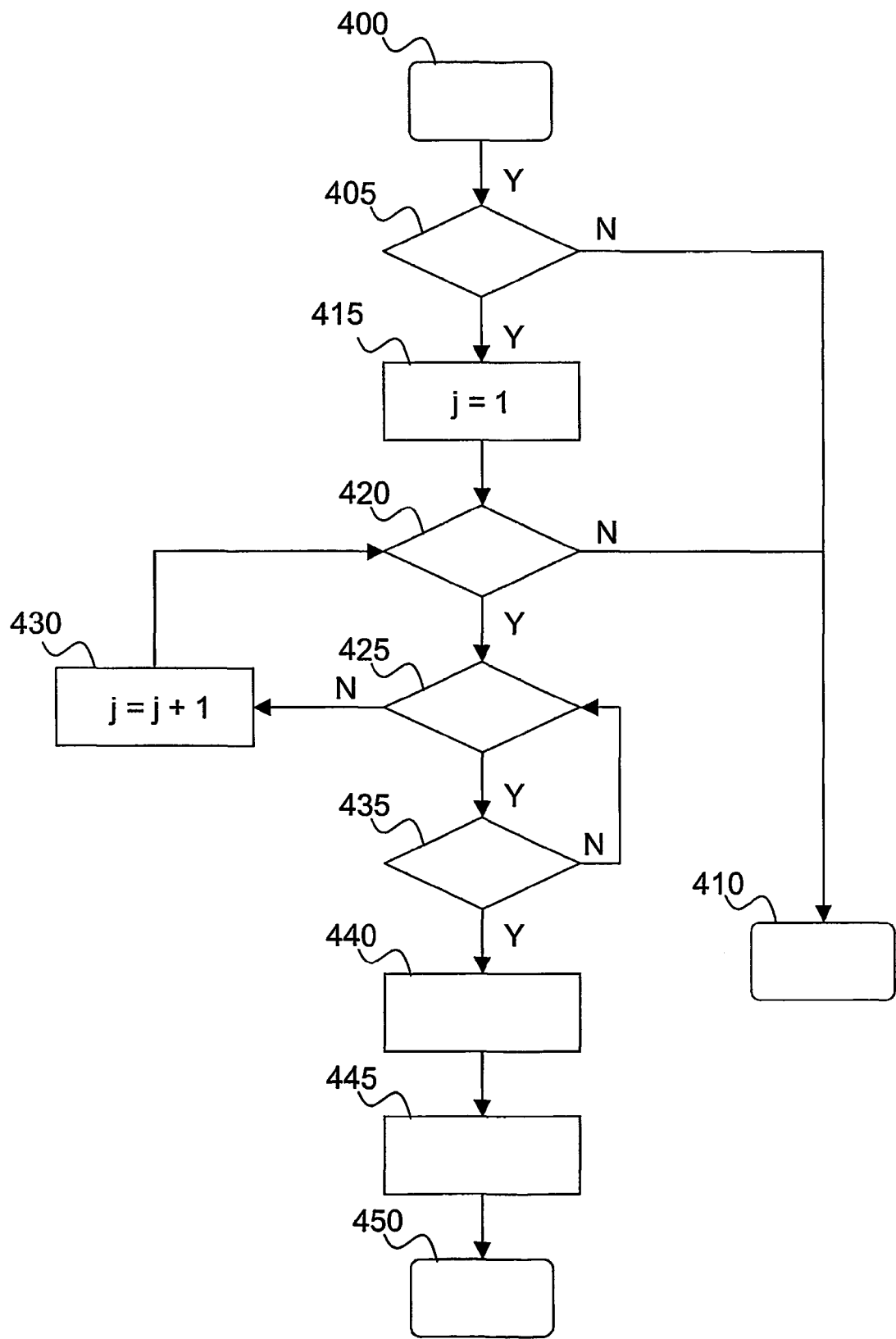
FIG. 4 is a flow chart of an embodiment of a method for allocating bandwidth to a multicast channel in the multipath multistage switch shown in FIG. 1.

FIG. 4 shows a flowchart of an embodiment of a method for allocating bandwidth to a multicast channel with a bandwidth BW, which multicast channel is to be established from an input port of a switching element in a first stage to at least two output ports of switching elements in a last stage of a multipath multistage switch as described with reference to FIG. 1. The input to the method when it is started in step 400, is the current bandwidth allocation in the multipath multistage switch, and the input port and the at least two output ports of the multicast channel. First, in step 405, it is checked if there is at least BW available bandwidth in the outgoing bitstream from each of the at least two output ports of the multicast channel. If there is not, the multicast channel cannot be established and the method is ended in step 410. If there is at least BW available bandwidth, the desired number of switching elements j in the intermediate stage that the multicast channel should be switched through, is set to one in step 415. Then, it is checked, in step 420, if j is less than or equal to the number of switching elements in the intermediate stage. If j is not less than or equal to the number of switching elements in the intermediate stage the multicast channel cannot be established and the method is ended in step 410. If j is less than or equal to the number of switching elements in the intermediate stage, it is checked, in step 425, if there is a set of j switching elements in the intermediate stage from which there is at least BW available bandwidth to each of the switching elements where the at least two output ports of the multicast channel are located. If there is not a set of j such switching elements, j is increased with one, in step 430, and the method is continued in step 420 for this increased j. If there is a set of j such switching elements, it is checked, in step 435, if there is at least BW available bandwidth from the switching element in the first stage where the input port of the multicast channel is located to each of the set of j switching elements. If there is not at least BW available bandwidth, the method is continued in step 425 where it is checked if there is another set of j switching elements in the intermediate stage from which there is at least BW available bandwidth to each of the switching elements where the at least two output ports of the multicast channel are located. If there is at least BW available bandwidth from the switching element in the first stage where the input port of the multicast channel is located to each of the set of j switching elements, the bandwidth BW is allocated, in step 440, to the multicast channel from the input port of the multicast channel to the j switching elements in the intermediate stage, and from the j switching elements in the intermediate stage to the at least two output ports of the multicast channel. After step 440, the method is continued in step 445 in which the switching element where the input port of the multicast channel is located, each of the set of j switching elements, and the switching elements where the at least two output ports of the multicast channel are located, are configured to map data pertaining to the multicast channel into the available time slots. Finally, the method is ended in step 450.

To illustrate the method described with reference to FIG. 4, an example of the allocation of bandwidth to a multcast channel by means of the control unit 120 will be described in the following with reference to FIG. 5A-D. FIG. 5A-D schematically show different stages of the allocation of bandwidth to a multicast channel in the multipath multistage switch in FIG. 1. The allocation is done in accordance with the method described with reference to FIG. 4. The same numbering of the switching elements and their respective input ports and output ports as in the description above with reference to FIG. 3, will be used. Furthermore, only the connections of interest are indicated in the FIGS. 5A-D. For these connection, an indication of occupied time slots of frames in bitstreams on each connection of interest are indicated as an O in the corresponding time slot.

The establishment of a channel with a bandwidth corresponding to three time slots out of four in each frame, from the second input port of the third switching element of the first stage to the second output port of the first switching element in the last stage and the third output port of the third switching element in the last stage, is requested. The request is signalled to the control unit 120, which has a full view of the number of available time slots throughout the multipath multistage switch. First, it is determined by means of the control unit 120 if there is sufficient bandwidth in the two output ports to which the channel should be multicasted. Since the bandwidth requirement is bandwidth corresponding to three time slots in each frame and there is only one out of four time slots that is occupied in each frame in the outgoing bitstreams from the two output ports to which the channel should be multicasted (see FIG. 5A), the bandwidth is sufficient. Next, the number of switching elements in the intermediate stage via which the multicast channel should be established is set to one and the available bandwidth from each switching element in the intermediate stage to the first and the third switching element, respectively, is determined until one switching element in the intermediate stage for which the bandwidth to the first and the third switching element, is sufficient to carry the multicast channel. The determination is done using a control unit 120 which has a full view of the number of available time slots throughout the multipath multistage switch.

Figure 5A:
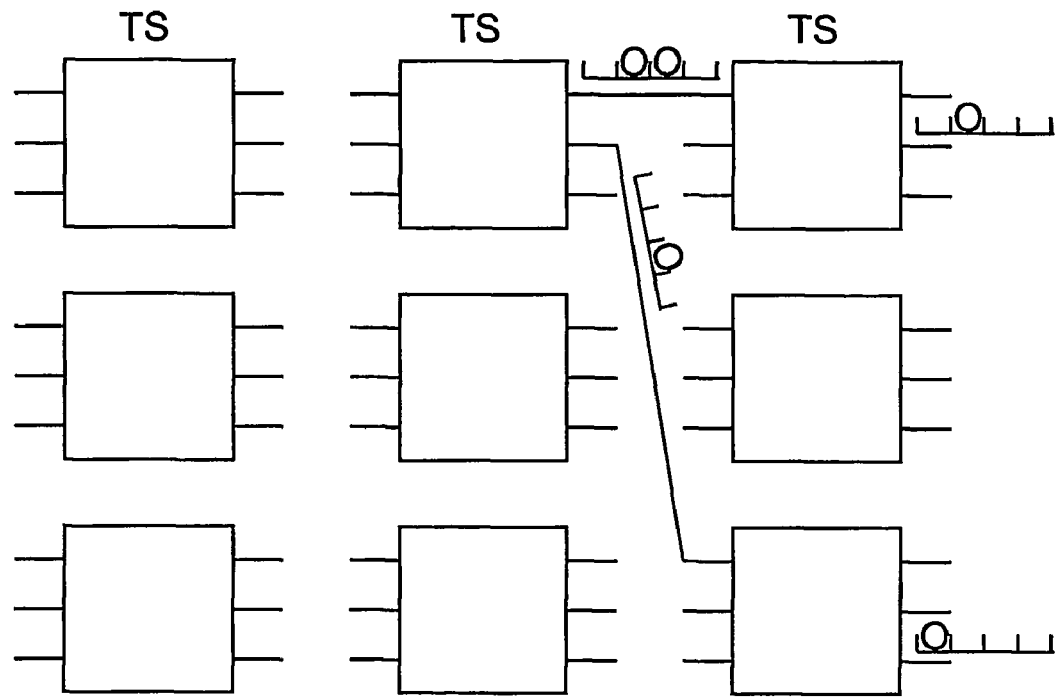
FIG. 5A-D schematically show different stages of the allocation of bandwidth to a multicast channel in the multipath multistage switch shown in FIG. 1.

In FIG. 5A it is shown that the available time slots of each frame in the outgoing bitstream from the first switching element in the intermediate stage to the first switching element in the last stage are only two. Thus, the multicast channel cannot be established only through the first switching element in the intermediate stage.

Figure 5B:
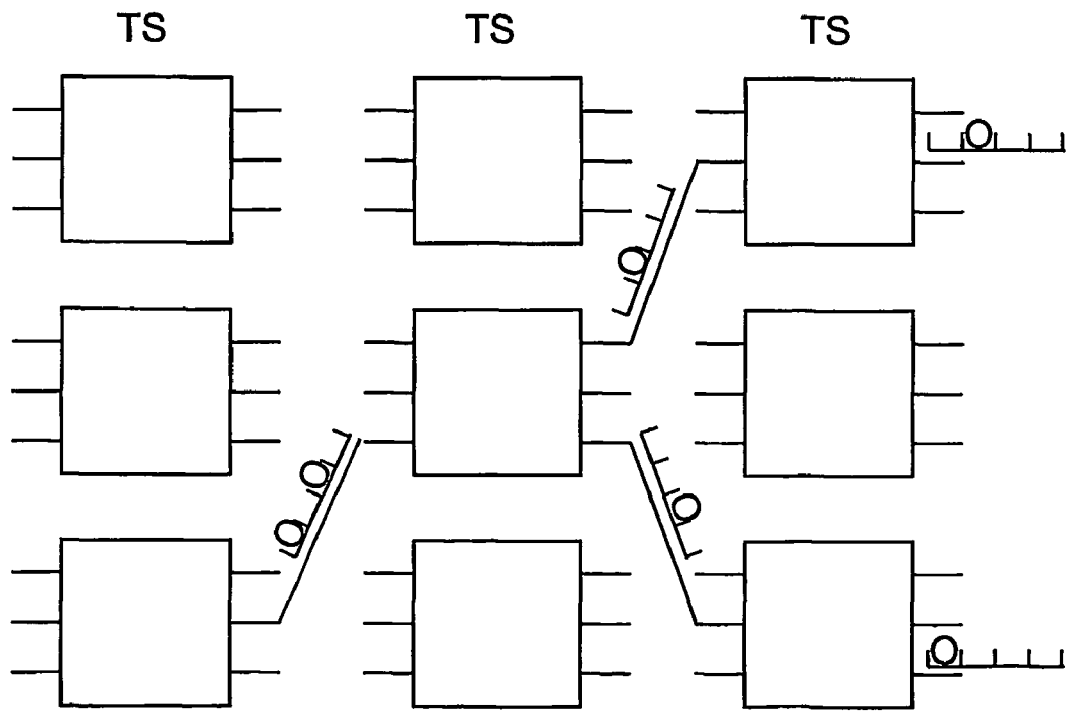

In FIG. 5B it is shown that the available time slots of each frame in the outgoing bitstream from the second switching element in the intermediate stage to the first switching element and the third switching element in the last stage, respectively, are three. Thus, the available bandwidth is sufficient to carry the multicast channel.

Then, it is determined, using the control unit 120, whether the bandwidth from the third switching element in the first stage to the second switching element in the intermediate stage is sufficient to carry the multicast channel. In FIG. 5B it is shown that there are two available time slots of each frame in the outgoing bitstream from the third switching element in the first stage to the second switching element in the intermediate stage. Thus, the multicast channel cannot be established only through the second switching element in the intermediate stage.

Figure 5C:
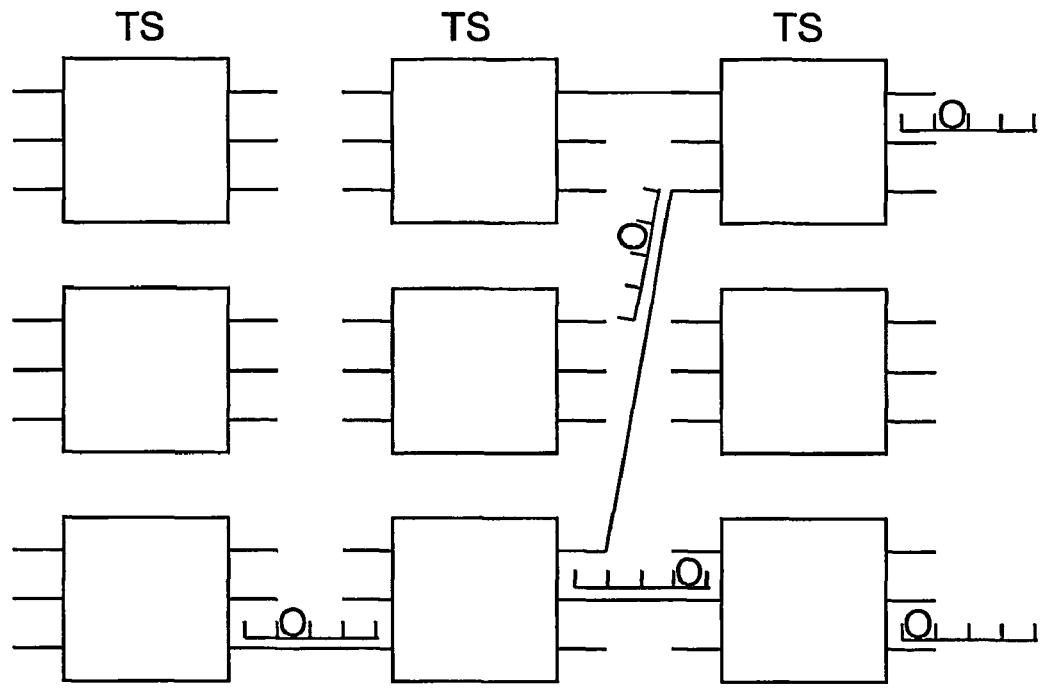

In FIG. 5C it is shown that the available time slots of each frame in the outgoing bitstream from the third switching element in the intermediate stage to the first switching element and the third switching element in the last stage, respectively, are three. Thus, the available bandwidth is sufficient to carry the multicast channel. Furthermore, it is shown that there are three available time slots of each frame in the outgoing bitstream from the third switching element in the first stage to the third switching element in the intermediate stage. Thus, the multicast channel can be established through the third switching element in the intermediate stage.

Having found one switching element in the intermediate stage that has enough bandwidth to carry the channel, each switching element through which the multicast channel is switched is configured so that data pertaining to the multicast channel are mapped into the available time slots in each of these switching elements. More specifically, the slot mapping table (SMT) of each of these switching elements is reconfigured using the control unit 120 which has a full view of these SMT:s and thus, of which time slots are available. The reconfiguration is done first in switching elements in the last stage, then in switching elements in the intermediate switch, and finally in switching elements in the first stage.

Figure 5D:
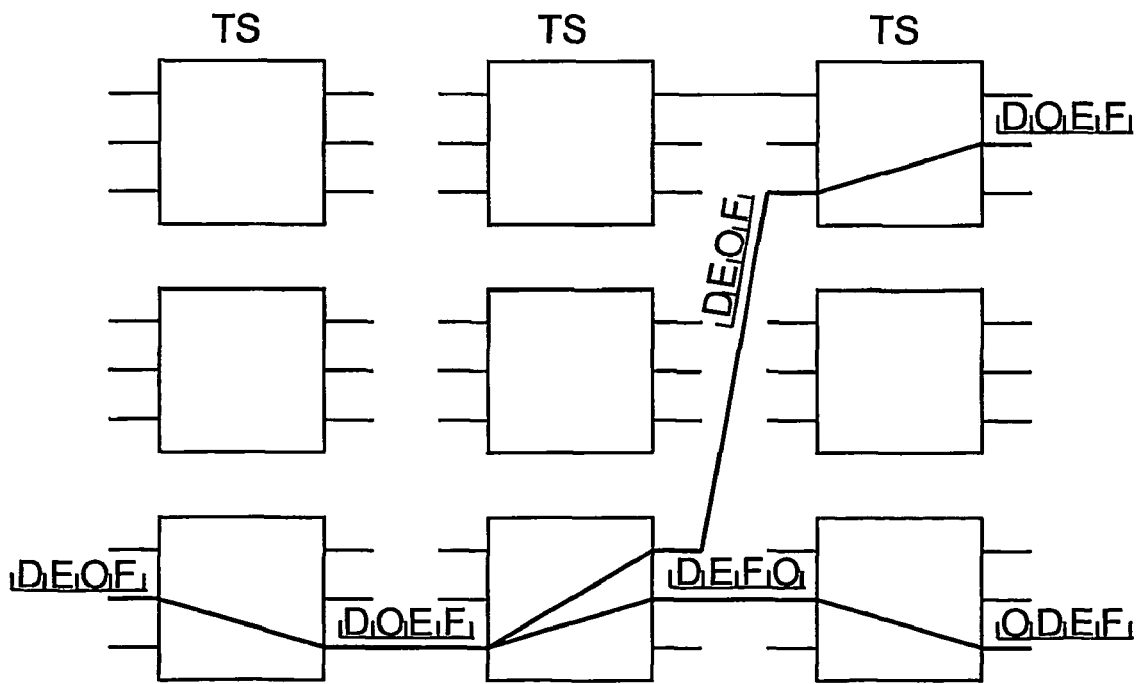

In FIG. 5D, the mapping of data D, E and F pertaining to the multicast channel into the available time slots, is shown.

Figure 6:
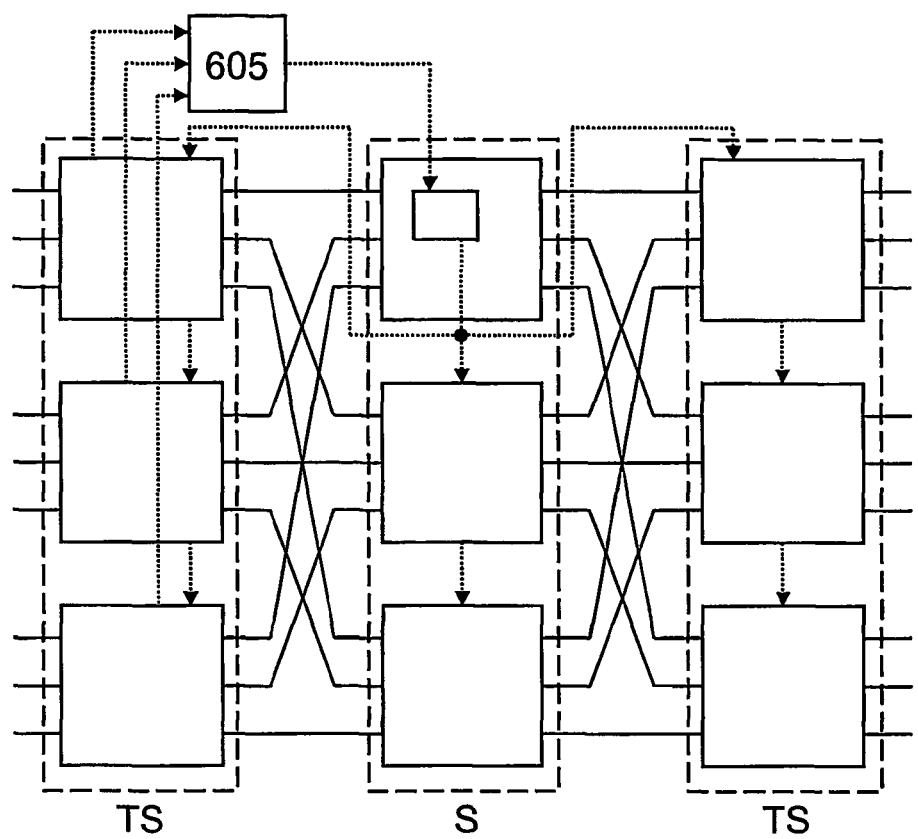
FIG. 6 is a schematic diagram of another embodiment of a multipath multistage switch according to the invention.

Referring now to FIG. 6, a schematic diagram of another embodiment of a multipath multistage switch according to the invention is shown. The multipath switch comprises nine switching elements arranged in a first stage, an intermediate stage and a last stage, each stage having three switching elements. Each switching element has three input ports and three output ports, where the output ports of a switching element in one stage are connected input ports of different switching element in a next stage. In operation, the input ports of the switching elements will be connected to receive data in bitstreams which are divided into essentially fixed sized frames, which in turn are divided into fixed sized time slots. Each of the switching elements in the first stage and the last stage is then capable of performing switching in both space and time of data from an incoming bitstream, referring to an input port of the switching element, to outgoing bitstreams, referring to the output ports of the switching element. In other words, data in a time slot of a frame in a bitstream, referring to an input port of a switching element in the first stage or the last stage, may be mapped into a arbitrary time slot of a frame in a bitstream, referring to any of the output ports of the switching element. Each of the switching elements in the intermediate stage is capable of performing space switching of data from an incoming bitstream, referring to an input port of the switching element, to outgoing bitstreams, referring to the output ports of the switching element. In other words, data in a time slot of a frame in a bitstream, referring to an input port of a switching element in the intermediate stage, may be mapped into a corresponding time slot of a frame in a bitstream, referring to any of the output ports of the switching element.

Note that the number of switching elements, the number of stages and the number of input and output ports of each switching element have been chosen merely as an example. The numbers may be chosen arbitrarily as long as the number of stages are at least three and there are more than one path from an input port of a switching element in the first stage to an output port of a switching element of the last stage. Moreover, the number of switching elements in the different stages need not be equal.

The multipath multistage switch is arranged so that there is no phase drift between the synchronisation signals of switching elements in the same stage. In this embodiment this is achieved as follows. An internal selecting unit (not shown) in each of the switching elements in the first stage selects a synchronisation signal from one of the input ports of the switching element. The selected synchronisation signals from the switching elements in the first stage are then fed to an external selecting unit 605 that selects one of them and feeds it to the uppermost switching element in the intermediate stage. The uppermost switching element then distributes the synchronisation signal to the uppermost switching element of the first and the last stages. The synchronisation signal is then fed downwards to each switching element in each stage. Note that there are no constraints on the phases of switching element in different stages.

Furthermore, the multipath multistage switch is arranged so that data, which are received between a pair of consecutive start of frame signals at input ports of different switching elements in a stage, will be sent between a pair of consecutive start of frame signals to input ports of switching elements in a next stage and will be received between a pair of consecutive start of frame signals at input ports of the switching elements in the next stage. In this embodiment this is achieved by using the distribution of the synchronisation signal as described above and adapting the delay of connections between switching elements in different stages.

Finally, the multipath multistage switch in FIG. 6 also comprises a control unit (not shown) for controlling the time and space switching of the switching elements in the first stage and the last stage and the space switching in the switching elements of the at least one intermediate stage. The control unit is operatively connected to each of the switching elements.

Figure 7:
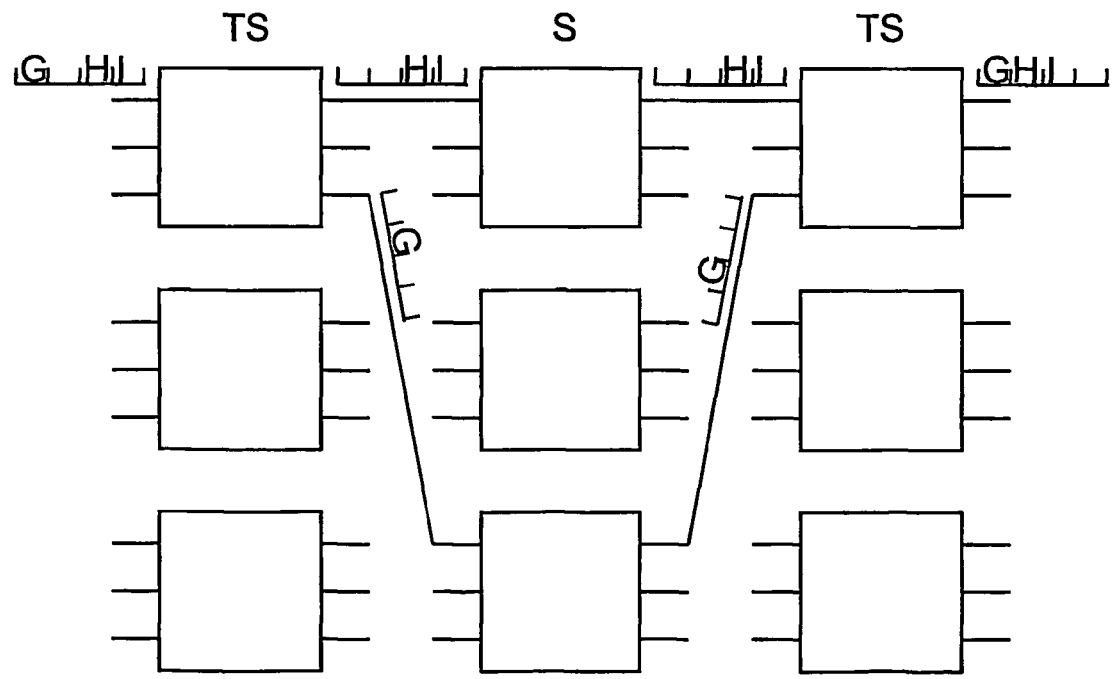
FIG. 7 schematically shows an example of the switching different portions of a single channel via multiple paths in the multipath multistage switch shown in FIG. 4.

FIG. 7 schematically shows an example of the switching of a single channel via multiple paths from an input port of a switching element in the first stage to an output port of a switching element in the last stage in the multipath multistage switch shown in FIG. 6. In the following, the switching elements of each stage of the multipath multistage switch in FIG. 7 are referred to as a first, a second and a third switching element from top to bottom, the input ports of each switching element are referred to as a first, a second and a third input port from top to bottom, and the output ports of each switching element are referred to as a first, a second and a third output port from top to bottom. Data G, H and I pertaining to the channel, are received in a first, a third and a fourth time slot, respectively, of a frame in an incoming bitstream at the first input port of the first switching element in the first stage. Thus, the data G, H and I are received between a pair of consecutive start of frame signals. In the first switching element in the first stage, the data H and I are mapped into a third and a fourth time slot, respectively, of a frame in an outgoing bitstream at the first output port of the switching element in the first stage and sent to the first input port of the first switching element in the intermediate stage. The data G are mapped into a second time slot of a frame in an outgoing bitstream at the third output port of the first switching element in the first stage and sent to the first input port of the third switching element in the intermediate stage. In the first switching element of the intermediate stage, the data H and I, which are received in the third and the fourth time slot, respectively, of a frame at the first input port, are mapped into corresponding time slots, i.e. a third and a fourth time slot, respectively, of a frame in an outgoing bitstream at the first output port of the first switching element in the intermediate stage, and sent to the first input port of the first switching element in the last stage. Furthermore, in the third switching element of the intermediate stage, the data G, which are received in the second time slot of a frame at the first input port, are mapped into a corresponding time slot, i.e. a second time slot, of a frame in an outgoing bitstream at the first output port of the third switching element in the intermediate stage, and sent to the third input port of the first switching element in the last stage. Since the data G, H and I were received in the first switching element in the first stage between a pair of consecutive start of frame signals, the synchronisation features of the multipath multistage switch described above, will ensure that the data G, H and I will be sent from the first switching element in the first stage between a pair of consecutive start of frame signals, and that they will be received in the respective switching elements in the intermediate stage between a pair of consecutive start of frame signals. Furthermore, the data G, H and I will be sent from the switching elements in the intermediate stage between a pair of consecutive start of frame signals, and they will be received in the first switching element in the last stage between a pair of consecutive start of frame signals. Thus, it is possible, in the first switching element of the last stage, to map the data G, H and I into a first, a second and a third time slot, respectively, of a frame in an outgoing bitstream from the first output port of the switching element.

Thus, it is understood that the way that a channel may be divided into portions that are switched via different paths through the multipath multistage switch in FIG. 6, will eliminate the problem with fragmentation in the case of multirate channels. Even though there is no single path through the multipath multistage switch in FIG. 6 that has enough available bandwidth to carry a channel, the channel may still be switched through multipath multistage switch as long as there are a set of paths that together have enough bandwidth to carry the channel.

Figure 8:
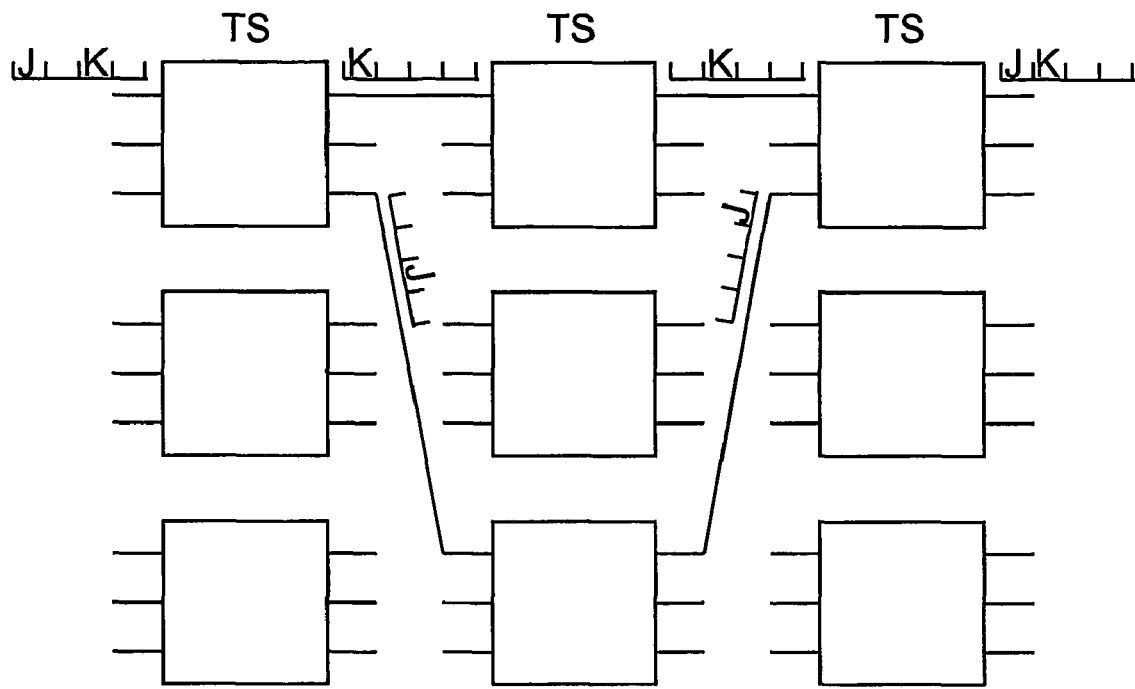
FIG. 8 and schematically shows an example of the switching of different portions of a single channel via multiple paths in a multipath multistage switch which is a combination of the multipath multistage switches shown in FIG. 1 and FIG. 5.

The embodiments of a multipath multistage switch described with reference to FIG. 1 and FIG. 6, respectively, may be combined with advantage. More specifically, an advantageous combination is a multipath multistage switch having the synchronisation features of the multipath multistage described with reference to FIG. 6, and the additional feature that the switching elements in the intermediate stage are capable of performing time switching, in addition to space switching, of data from an incoming bitstream, referring to an input port of the switching element, to outgoing bitstreams, referring to the output ports of the switching element, as is the case for the multipath multistage switch described with reference to FIG. 1. FIG. 8 schematically shows an example of the switching of a single channel via multiple paths from an input port of a switching element in the first stage to an output port of a switching element in the last stage in such a combination the multipath multistage switch. As in the description with reference to FIG. 7, the switching elements of each stage of the multipath multistage switch in FIG. 8 are referred to as a first, a second and a third switching element from top to bottom, the input ports of each switching element are referred to as a first, a second and a third input port from top to bottom, and the output ports of each switching element are referred to as a first, a second and a third output port from top to bottom. The main difference between these examples and the example described with reference to FIG. 7, is that the switching elements in the intermediate stage are capable of performing time switching. Thus, data that are received in time slots of a frame in an incoming bitstream at an input port of a switching element in the intermediate stage may be mapped into arbitrary time slots of a frame in an outgoing bitstream at any one of the output ports of the switching element in the intermediate stage. For example, in FIG. 8, data J that are received in a third time slot of a frame in an incoming bitstream at the first input port of the third switching element in the intermediate stage, are mapped into a fourth time slot of a frame in an outgoing bitstream at the first output port of the third switching element in the intermediate stage. Moreover, data that are received in time slots of a frame in an incoming bitstream at an input port of a switching element in the first stage may even be mapped into time slots of frames in outgoing bitstreams at output ports of the switching element in the first stage in another order than the order in the incoming bitstream. For example, in FIG. 8, data J and K that are received in a first and a third time slot, respectively, of a frame in an incoming bitstream at the first input port of the first switching element in the first stage, are mapped into a third time slot of a frame in an outgoing bitstream at the third output port of the switching element and a first time slot of a frame in an outgoing bitstream at the first output port of the switching element in the intermediate stage, respectively. However, when the data J and K eventually are mapped into a frame in an outgoing bitstream at the first output port of the first switching element in the last stage the order of the data are the same as they were received at the first input port of the first switching element in the first stage.

Since the data J and K were received in the first switching element in the first stage in the same frame, i.e. between a pair of consecutive start of frame signals, the synchronisation features of the multipath multistage switch described above with reference to FIG. 6, will ensure that the data J and K will be sent from the first switching element in the first stage between a pair of consecutive start of frame signals, and that they will be received in the respective switching elements in the intermediate stage between a pair of consecutive start of frame signals. Furthermore, the data J and K will be sent from the switching elements in the intermediate stage between a pair of consecutive start of frame signals, and they will be received in the first switching element in the last stage between a pair of consecutive start of frame signals. Thus, it is possible, in the first switching element of the last stage, to map the data J and K into a first and a second time slot, respectively, of the same frame in an outgoing bitstream from the first output port of the switching element.

Figure 9:
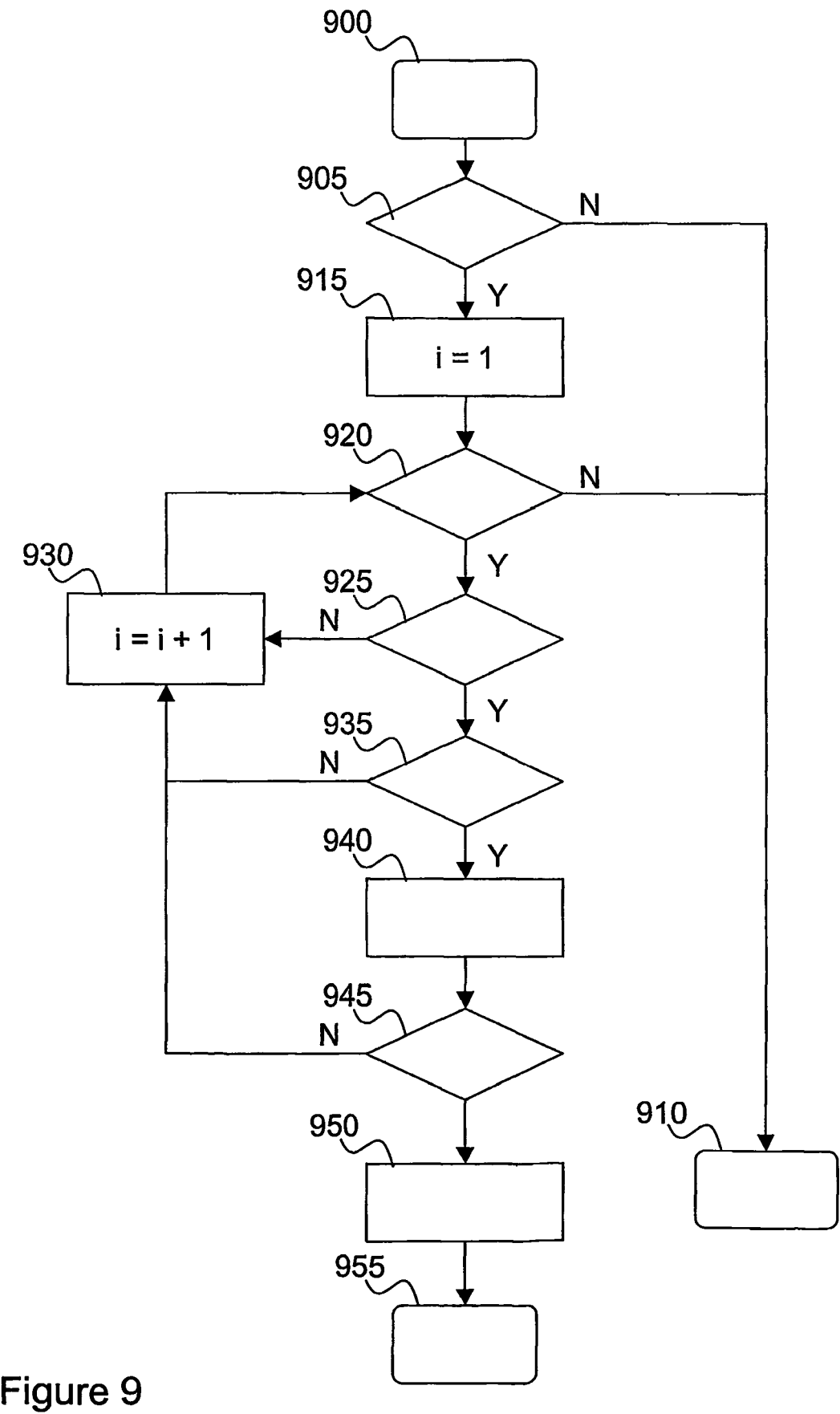
FIG. 9 is a flow chart of an embodiment of a method for allocating bandwidth to different portions of a single channel on multiple paths in a multipath multistage switch which is a combination of the multipath switches shown in FIG. 1 and FIG. 6.

FIG. 9 shows a flowchart of an embodiment of a method for allocating bandwidth on multiple paths to a single channel with a bandwidth BW, which channel is to be established from an input port of a switching element in a first stage to an output port of a switching element in a last stage of a multipath multistage switch as described with reference to FIG. 8. The input to the method when it is started in step 900, is the current bandwidth allocation in the multipath multistage switch, and the input port and the output port of the channel. Furthermore, the switching elements of the intermediate stage are numbered consecutively, e.g. from top to bottom. First, in step 905, it is checked if there is enough available bandwidth in the output port of the channel to carry the channel. If there is not, the channel cannot be established and the method is ended in step 910. If there is enough available bandwidth in the output port of the channel, i, which is the switching element in the intermediate stage that should be checked for available bandwidth, is set to one in step 915. Then, it is checked, in step 920, if i is less than or equal to the number of switching elements in the intermediate stage. If i is not less than or equal to the number of switching elements in the intermediate stage the channel cannot be established and the method is ended in step 910. If i is less than or equal to the number of switching elements in the intermediate stage, it is checked, in step 925, if there is any available bandwidth from the switching element in the first stage where the input port of the channel is located to the switching element i in the intermediate stage. If there is no available bandwidth, i is increased by one, in step 930, and the method is continued in step 920 for the switching element i in the intermediate stage. If there is any available bandwidth, it is checked, in step 935, if there is any available bandwidth from the switching element i in the intermediate stage to the switching element in the last stage where the output port of the channel is located. If there is no available bandwidth, i is increased by one, in step 930, and the method is continued in step 920 for the switching element i in the intermediate stage. If there is any available bandwidth, a bandwidth corresponding to the least of the available bandwidth from the switching element in the first stage where the input port of the channel is located to the switching element i in the intermediate stage, the available bandwidth from the switching element i in the intermediate stage to the switching element in the last stage where the output port of the channel is located, and the remaining bandwidth to be allocated to the channel, is allocated to the channel in step 940. Then, in step 945, it is checked if the total amount of bandwidth that has been allocated to the channel is equal to the bandwidth of the channel. If the total amount of bandwidth that has been allocated to the channel is less than BW, i is increased by one, in step 930, and the method is continued in step 920 for this increased i. If the total amount of bandwidth that has been allocated to the channel is equal to BW, the method is continued in step 950 in which the switching element in the last stage where the output port of the channel is located, each of the switching elements in the intermediate stage in which bandwidth has been allocated, and the switching element in the first stage where the input port of the channel is located, are configured to map data pertaining to the multicast channel into the available time slots. Finally, the method is ended in step 955.

The method described with reference to FIG. 4 may advantageously be combined with the method described with reference to FIG. 9. In this way, according to the combined method, bandwidth may be allocated to the multicast channel along multiple paths from the input port of the multicast channel to one of the output ports of the multicast channel. This is advantageous since it will decrease the bandwidth usage between the first and the intermediate stage in case of multicast.

In order to illustrate the method described with reference to FIG. 9, an example of the allocation of bandwidth to a multcast channel will be described in the following with reference to FIG. 10A-D. FIG. 10A-D schematically show different stages of the allocation of bandwidth to a channel in the multipath multistage switch in FIG. 8. The allocation is done in accordance with the method described with reference to FIG. 9. The allocation is done using a control unit (not shown) which has a full view of the number of available time slots throughout the multipath multistage switch. The same numbering of the switching elements and their respective input ports and output ports as in the description above with reference to FIG. 8, will be used. Furthermore, only the connections of interest are indicated in the FIGS. 10A-D. For these connection, an indication of occupied time slots of frames in bitstreams on each connection of interest are indicated as an O in the corresponding time slot.

Figure 10A:
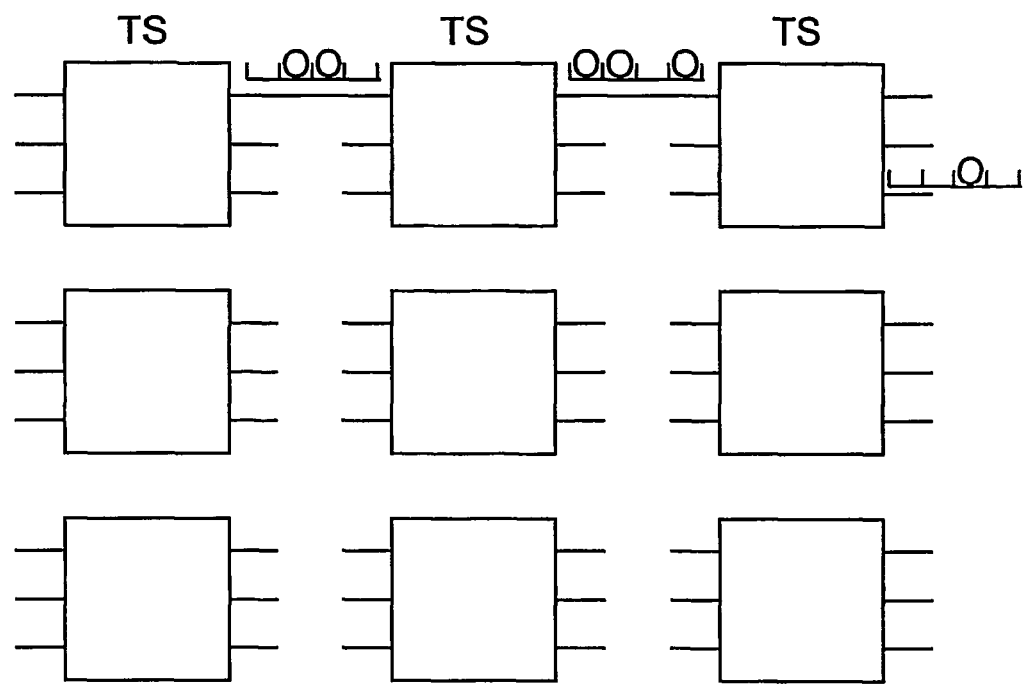
FIG. 10A-D schematically show different stages of the allocation of bandwidth to different portions of a single channel on multiple paths in the multipath multistage switch shown in FIG. 8.

The establishment of a channel with a bandwidth corresponding to three time slots out of four in each frame, from the second input port of the first switching element of the first stage to the third output port of the first switching element in the last stage, is requested. The request is signalled to the control unit (not shown), which has a full view of the number of available time slots throughout the multipath multistage switch. When the method starts the remaining bandwidth to be allocated to the channel is bandwidth corresponding to three time slots. First, the available bandwidth in the third output port of the first switching element in the last stage is determined. In FIG. 10A it is shown that the there are three available time slots at the third output port of the first switching element in the last stage. Thus, there is enough bandwidth. Then, the first switching element in the intermediate stage is chosen and the available bandwidth from the first switching element in the first stage to the first switching element in the intermediate is determined. In FIG. 10A it is shown that there are two time slots available between these two switching elements. Then, the available bandwidth between the first switching element in the intermediate stage to the first switching element in the last stage is determined. In FIG. 10A it is shown that there is one time slot available between these two switching elements. Then, it is determined which is the least of the bandwidth between the first switching element in the first stage and the first switching element in the intermediate stage, the bandwidth between the first switching element in the intermediate stage and the first switching element in the last stage, and the remaining bandwidth to be allocated to the channel. In this case the bandwidth corresponding to one time slot between the first switching element in the intermediate stage and the first switching element in the last stage is the least. Thus, bandwidth corresponding to one time slot is allocated to the channel.

Figure 10B:
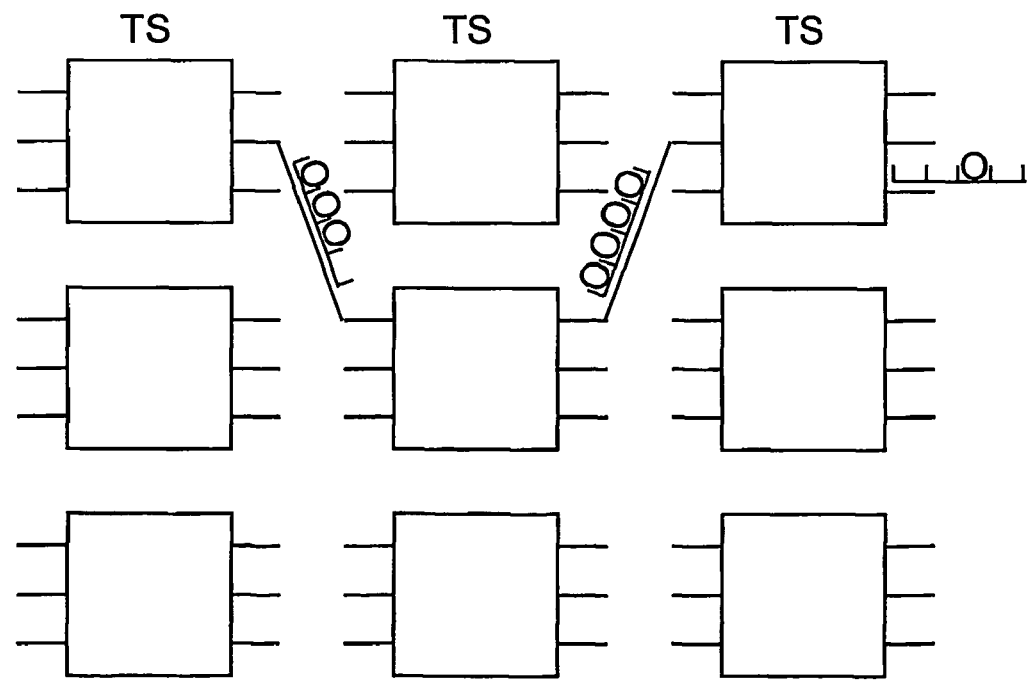

Since the bandwidth allocated to the channel is less than the total bandwidth of the channel, the second switching element in the intermediate stage is chosen and the available bandwidth from the first switching element in the first stage to the second switching element in the intermediate is determined. In FIG. 10B it is shown that there is one time slots available between these two switching elements. Then, the available bandwidth between the second switching element in the intermediate stage to the first switching element in the last stage is determined. In FIG. 10B it is shown that there is no time slots available between these two switching elements. Thus, no bandwidth can be allocated to the channel.

Figure 10C:
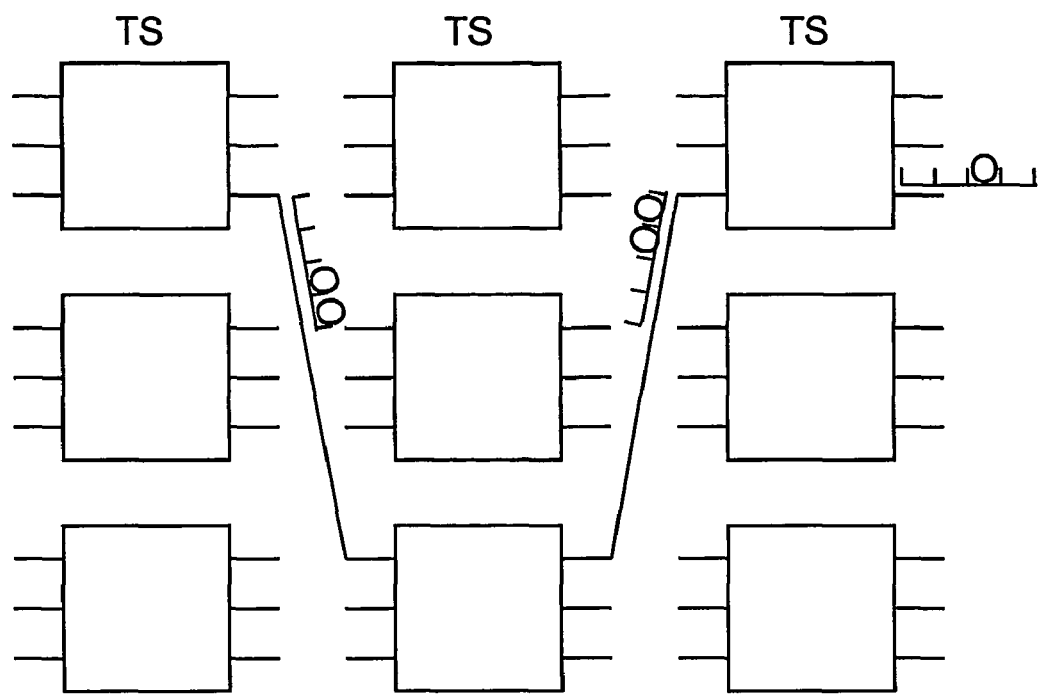

Since the bandwidth allocated to the channel is still less than the total bandwidth of the channel, the third switching element in the intermediate stage is chosen and the available bandwidth from the first switching element in the first stage to the third switching element in the intermediate is determined. In FIG. 10C it is shown that there are two time slots available between these two switching elements. Then, the available bandwidth between the third switching element in the intermediate stage to the first switching element in the last stage is determined. In FIG. 10C it is shown that there are two time slots available between these two switching elements. Then, it is determined which is the least of the bandwidth between the first switching element in the first stage and the first switching element in the intermediate stage, the bandwidth between the first switching element in the intermediate stage and the first switching element in the last stage, and the remaining bandwidth to be allocated to the channel. In this case they are all equal. Thus, bandwidth corresponding to two time slot are allocated to the channel.

Now, since the bandwidth allocated to the channel is equal to the bandwidth of the channel, each switching element through which the channel is to be switched is configured so that data pertaining to the multicast channel are mapped into the available time slots in each of these switching elements. More specifically, the slot mapping table (SMT) of each of these switching elements is reconfigured using the control unit (not shown) which has a full view of these SMT:s and thus, of which time slots are available. The reconfiguration is done first in switching elements in the last stage, then in switching elements in the intermediate switch, and finally in switching elements in the first stage.

Figure 10D:
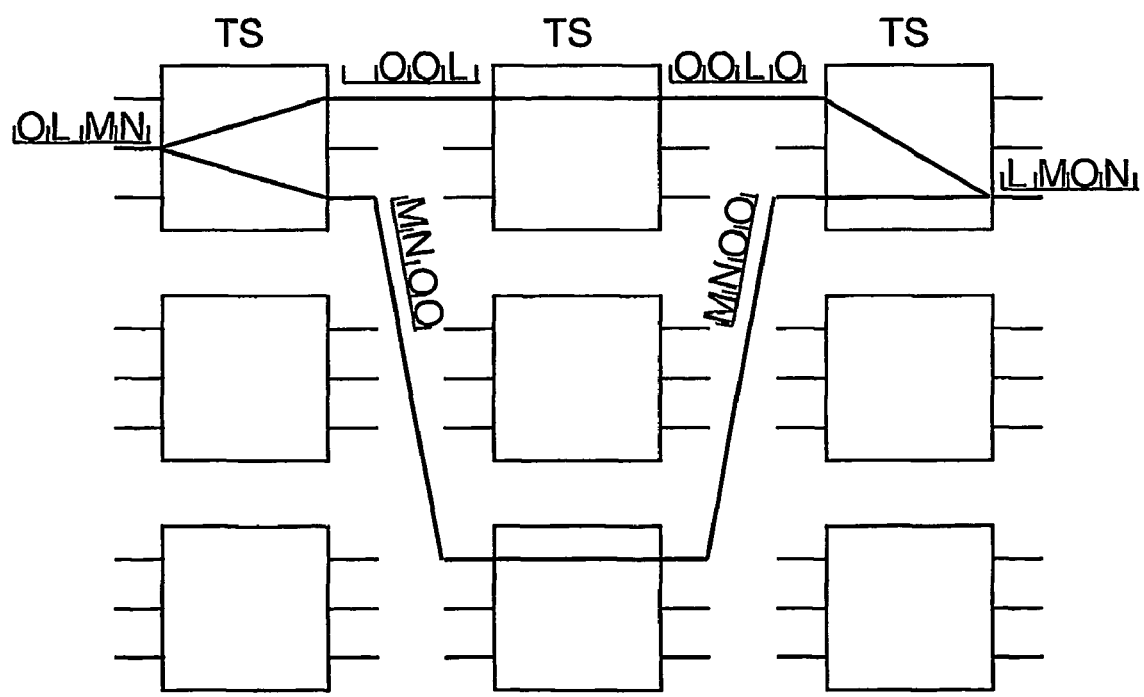

In FIG. 10D, the mapping of data L, M and N pertaining to the channel into the available time slots, is shown.

Figure 11:
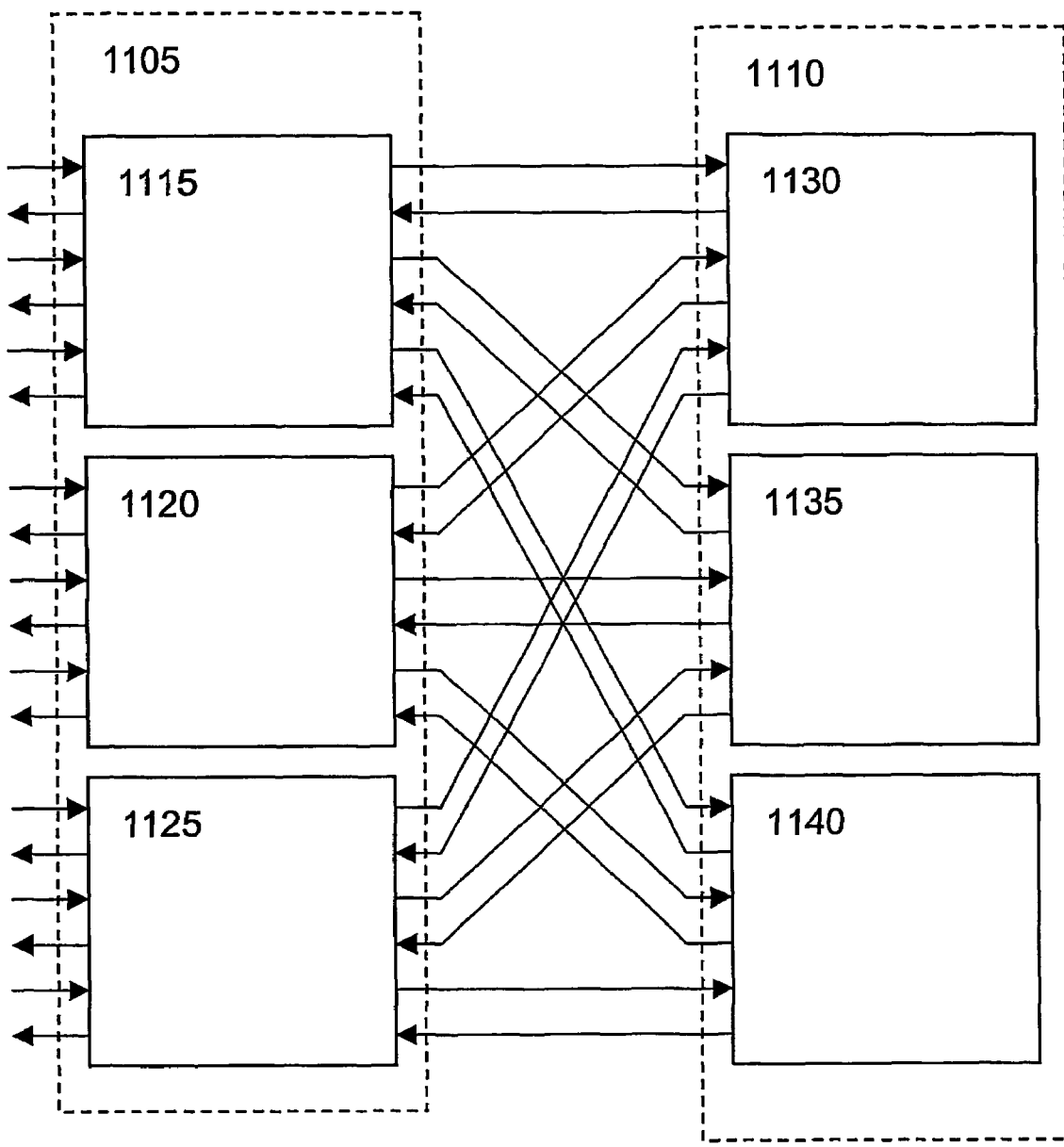
FIG. 11 schematically shows an alternative realisation of a multipath multistage switch according to FIG. 1 or FIG. 6.

Furthermore, in an alternative, both the embodiment described with reference to FIG. 1 and the embodiment described with reference to FIG. 6 may be realised such that the input stage and the output stage are implemented in the same physical equipment. In FIG. 11 such a realisation of a multipath multistage switch according to the invention, is shown. The multipath multistage switch comprises a common input and output stage 1105 and an intermediate stage 1110. As can be seen from the figure the switching elements 1115, 1120 and 1125 in the common input and output stage 1105 each has twice as many input ports and output ports as each switching element of the switching elements 1130, 1135 and 1140 in the intermediate stage 1110. Moreover, this realisation has the advantage that data that should be switched from an input port in a switching element in the common input and output stage 1105 to an output port in the same switching element may be switched internally in the switching element. Thus, this type of data does not use any bandwidth in the intermediate stage.

In one example of a realisation in accordance with FIG. 11, each of the switch elements 1115, 1120, 1125, 1130, 1135, 1140 is a separate switch, which may be placed on different premises. In this type of realisation the set-up of channels and the time switching of each switch is preferably controlled by means of a distributed scheme, i.e. when a channel is to be set-up, the set-up is controlled locally at each switch based on information in requirement messages and response messages. For example such a distributed scheme could use a signalling scheme that accommodates for the fact that there are multiple paths from one switch to another switch and that uses load sharing between the paths by means of Crank Back.

In another example of a realisation in accordance with FIG. 11, each of the switch elements 1115, 1120, 1125 are mounted on a respective board, whilst the switch elements 1130, 1135, 1140 are mounted on the same board. In this type of realisation the set-up of channels and the time switching of each switch is preferably controlled by means of a centralised control unit as described above with reference to FIG. 1.

The embodiments of multipath multistage switches described with reference to FIG. 1 and FIG. 6, respectively, and the combination thereof, may be used with advantage in several network scenarios, including both packet switched and circuit switched networks. Two example scenarios are shown in FIG. 12 and FIG. 13 and will be described in the following.

Figure 12:
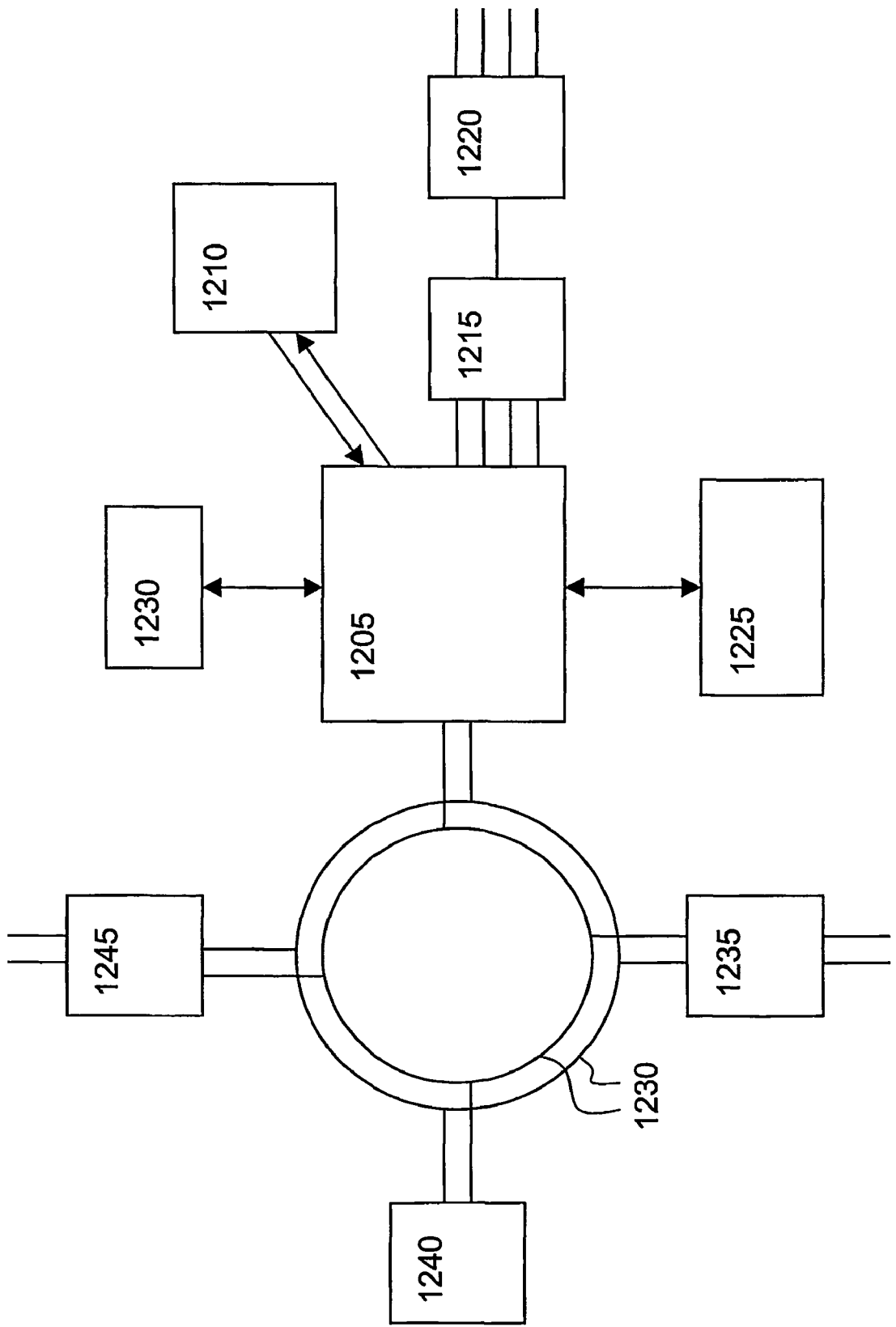
FIG. 12 schematically shows a network in which the multipath multistage switch in FIG. 1 or FIG. 6, respectively, may be used with advantage.

In FIG. 12 a network in which the multipath multistage switch in FIG. 1 or FIG. 6, respectively, may be used with advantage, is shown. In this scenario the multipath multistage switch 1205 is a DTM (Dynamic Transfer Mode) switch, which is used as a multiservice switch. The DTM switch 1205 is connected to another DTM switch 1210 via a DTM interface. Furthermore, it is connected to a DWDM (Dense Wavelength Division Multiplexing) node 1215 via an optical interface. The DWDM node 1215 is connected to another DWDM node 1220 via a DWDM interface on which each DTM channel from the DTM switch 1205 are sent on a different wavelength. Moreover, the DTM switch 1205 is connected to a PSTN (Public Switched Telephone Network) node 1225 by means of PDH (Plesiochronous Digital Hierarchy) technology and an IP (Internet Protocol) router 1230. Finally, the DTM switch 1205 is connected to a bi-directional DTM ring 1235 with three PDH nodes 1240, 1245 and 1250 connected to it.

Figure 13:
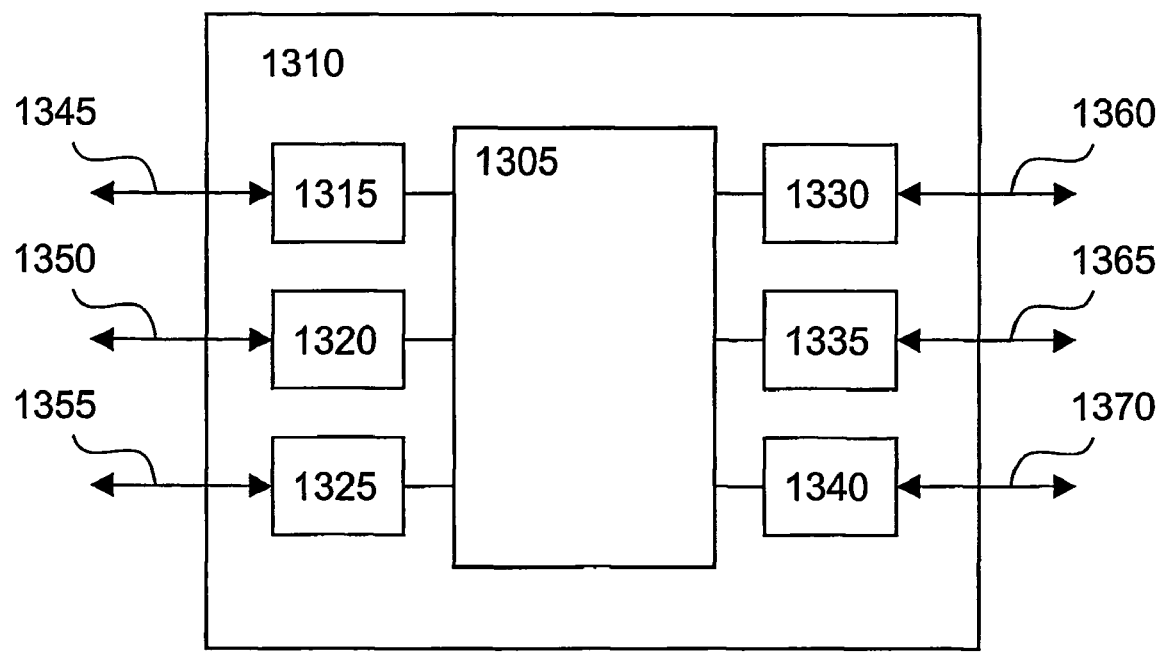
FIG. 13 schematically shows a scenario where the multipath multistage switch in FIG. 1 or FIG. 6, respectively, is applied in an IP network.

In FIG. 13 a scenario where the multipath multistage switch in FIG. 1 or FIG. 6, respectively, or a combination thereof is applied in an IP router, is schematically shown. In this scenario the multipath multistage switch 1305 is the switch fabric of the IP router. A number of line cards 1315-1340 are connected to the switch 1305. The line cards comprises IP interworking functionality and act as interfaces between the IP network and the switch 1305. Furthermore, the underlying protocol the IP traffic is transported over on the connections 1345-1370 may differ. For example, the link 1330 may be an Ethernet link, the link 1335 may be an SONET link, the link 1340 may be a DWDM link, etc.

The invention claimed is:

1. An apparatus for switching data between a first set of bitstreams and a second set of bitstreams, each of said bitstreams being divided into recurring frames and each of said recurring frames being divided into time slots, comprising:

a first set of switching elements, at least one intermediate set of switching elements, and a last set of switching elements, wherein each switching element comprises a number of input ports and a number of output ports, and a control unit for controlling the allocation of bandwidth in outgoing bitstreams, referring to the output ports of the switching elements, said control unit being operatively connected to each of the switching elements, wherein the input ports of said first set of switching elements are arranged to receive said first set of bitstreams and the output ports of each switching element in said first set of switching elements are operatively connected to input ports of more than one switching element in one of said at least one intermediate set of switching elements, wherein the input ports of each switching element of said last set of switching elements are operatively connected to output ports of more than one switching element in one of said at least one intermediate set of switching elements and the output ports of said last set of switching elements are arranged to provide said second set of bitstreams, wherein each switching element is arranged so that it provides for both time and space switching of data from incoming bitstreams, referring to the input ports of each said switching element, to outgoing bitstreams, referring to the output ports of each said switching element, and wherein the control unit determines whether there is one switching element in said intermediate set of switching elements, for which there is enough available bandwidth to carry a channel in bitstreams from said one switching element to the switching elements in said last set of switching elements, and determines, in the case where there is one such switching element, whether there is enough available bandwidth to carry the channel in one bitstream from a switching element of said first set of switching elements to said one switching element.

2. The apparatus according to claim 1, wherein said switching elements each comprise a slot mapping table designating, for each outgoing time slot of frames of outgoing bitstreams, referring to the output ports of each said switching element, an incoming time slot of a frame of an incoming bitstream, referring to an input port of each said switching element, from which incoming time slot data that should be written into the outgoing time slot should be fetched, and wherein said control unit is arranged to control the behaviour of the slot mapping table of each switching element.

3. The apparatus according to claim 1, wherein said switching elements are arranged so that data which are received between a pair of consecutive start of frame signals at input ports of switching elements in said first set of switching elements, will be received between a pair of consecutive start of frame signals at input ports of switching elements in said last set of switching elements.

4. The apparatus according to claim 1, wherein said switching elements are arranged so that all bitstreams between output ports of switching elements and input ports of other switching elements are asynchronous on a bit level, whilst they are synchronous on a frame level.

5. A method for allocating bandwidth to a multicast channel from an input port to at least two output ports in a switching apparatus comprising a first set of switching elements, an intermediate set of switching elements, and a last set of switching elements, wherein each switching element comprises a number of input ports and a number of output ports, and wherein the output ports of said first set of switching elements are operatively connected to the input ports of said intermediate set of switching elements, and wherein the output ports of said intermediate set of switching elements are operatively connected to the input ports of said last set of switching elements, the method comprising:

(a) determining whether there is one switching element in said intermediate set of switching elements, for which there is enough available bandwidth to carry the channel in bitstreams from said one switching element to the switching elements in said last set of switching elements comprising said at least two output ports, (b) determining, in the case where there is one such switching element, whether there is enough available bandwidth to carry the channel in one bitstream from the switching element of said first set of switching elements comprising said input port to said one switching element, and (c) allocating, if it is determined from step (b) that there is one such switching element in said intermediate set of switching elements, bandwidth to the channel in said bitstream from the switching elements of said first set of switching elements comprising said input port to said one switching element, and in said bitstreams from said one switching element to the switching elements in said last set of switching elements comprising said at least two output ports.

6. The method according to claim 5, further comprising:

(d) determining, if there is not one such switching element in said intermediate set of switching elements, whether there are two switching elements in said intermediate set of switching elements, for which there is enough available bandwidth to carry the channel in bitstreams from the switching element of said first set of switching elements comprising said input port to said two switching elements, and there is enough available bandwidth to carry the channel in bitstreams from said two switching elements to the switching elements in said last set of switching elements comprising said at least two output ports; and (e) allocating, if there are two such switching elements in said intermediate set of switching elements, bandwidth to the channel in said bitstreams from the switching element of said first set of switching elements comprising said input port to said two switching elements, and in said bitstreams from said two switching elements to the switching elements in said last set of switching elements comprising said at least two output ports.

* * * * *